US010796435B2

United States Patent
Yamaguchi

(10) Patent No.: US 10,796,435 B2
(45) Date of Patent: Oct. 6, 2020

(54) IMAGE PROCESSING METHOD AND IMAGE PROCESSING APPARATUS

(71) Applicant: FUJITSU LIMITED, Kawasaki-shi, Kanagawa (JP)

(72) Inventor: Nobuyasu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 137 days.

(21) Appl. No.: 16/140,622

(22) Filed: Sep. 25, 2018

(65) Prior Publication Data

US 2019/0102885 A1    Apr. 4, 2019

(30) Foreign Application Priority Data

Sep. 29, 2017  (JP) .................................. 2017-189661

(51) Int. Cl.
  *G06T 7/13*        (2017.01)
  *G06T 7/12*        (2017.01)
  (Continued)

(52) U.S. Cl.
  CPC .............. *G06T 7/13* (2017.01); *G06K 9/3241* (2013.01); *G06K 9/46* (2013.01); *G06T 7/12* (2017.01); *G06T 7/181* (2017.01)

(58) Field of Classification Search
  CPC .. G06T 7/13; G06T 7/181; G06T 7/12; G06T 7/0012; G06T 7/136; G06K 9/3241;
  (Continued)

(56) References Cited

U.S. PATENT DOCUMENTS 7,212,672 B2 * 5/2007 Fujieda ................. G06T 7/0006
                                                                    382/199
8,059,889 B2 * 11/2011 Kobayashi ............. G06K 9/209
                                                                    348/135
(Continued)

FOREIGN PATENT DOCUMENTS

JP    2012-053617    3/2012
JP    2015-040827    3/2015
(Continued)

OTHER PUBLICATIONS

Nakayama et al., "Accurate Camera Pose Estimation for KinectFusion Based on Line Segment Matching by LEHF", International Conference on Pattern Recognition, IEEE Computer Society, US, Aug. 24, 2014, pp. 2149-2154, XP032698373. Cited in EESR dated Mar. 7, 2019 corresponding to European Patent Application No. 18196217.6.

(Continued)

*Primary Examiner* — Michael S Osinski
(74) *Attorney, Agent, or Firm* — Fujitsu Patent Center

(57) ABSTRACT

An image processing method includes calculating a first feature-quantity that includes feature-quantities for indicating features of individual pixel values of pixels located in a first direction perpendicular to a first line segment out of line segments and feature-quantities for indicating features of individual pixel values of pixels located in a second direction opposite to the first direction with respect to the first line segment, and calculating, based on pixel values of pixels located for each predetermined distance in a third direction perpendicular to a second line segment out of the line segments and pixel values of pixels located for each of the predetermined distance in a fourth direction opposite to the third direction with respect to the second line segment, a second feature-quantity that includes feature-quantities for (Continued)

indicating individual features of the pixels located for each of the predetermined distance from the second line segment.

12 Claims, 28 Drawing Sheets

(51) Int. Cl.
*G06K 9/32* (2006.01)
*G06K 9/46* (2006.01)
*G06T 7/181* (2017.01)

(58) Field of Classification Search
CPC .......... G06K 9/46; G06K 9/4604; G06K 9/32; G06K 9/00798; G06K 9/209; H04N 1/00748; H04N 1/4092; H04N 5/142
See application file for complete search history.

(56) References Cited

U.S. PATENT DOCUMENTS

| | | | | |
|---|---|---|---|---|
| 8,699,786 | B2* | 4/2014 | Kotake | G06T 7/55 382/154 |
| 9,065,968 | B2* | 6/2015 | Kono | H04N 5/142 |
| 10,359,727 | B2* | 7/2019 | Otani | H04N 1/407 |
| 10,574,846 | B2* | 2/2020 | Fujii | H04N 1/00748 |
| 2008/0292180 | A1* | 11/2008 | Kobayashi | G06T 7/75 382/154 |
| 2012/0057776 | A1* | 3/2012 | Tao | G06T 7/536 382/154 |
| 2012/0076419 | A1* | 3/2012 | Kono | G06T 7/13 382/195 |
| 2012/0242896 | A1* | 9/2012 | Yamagishi | H04N 7/0142 348/448 |
| 2013/0182961 | A1* | 7/2013 | Tay | H04N 5/23212 382/199 |
| 2014/0285662 | A1* | 9/2014 | Murashita | G06K 9/4604 348/148 |
| 2014/0285861 | A1* | 9/2014 | Kondo | G06T 11/60 358/538 |
| 2015/0201120 | A1* | 7/2015 | Irie | G06K 9/00798 348/148 |
| 2015/0310284 | A1* | 10/2015 | Sakamoto | G06K 9/4604 701/41 |
| 2015/0310636 | A1* | 10/2015 | Yoo | G06T 11/40 345/593 |
| 2016/0055751 | A1* | 2/2016 | Park | G08G 1/167 701/301 |
| 2017/0098310 | A1* | 4/2017 | Chefd'hotel | G06T 7/136 |
| 2017/0124710 | A1* | 5/2017 | Kwon | G06T 7/80 |
| 2017/0132752 | A1 | 5/2017 | Aoyagi et al. | |
| 2018/0240240 | A1* | 8/2018 | Nakagawa | G06T 7/0012 |
| 2019/0256159 | A1* | 8/2019 | Zhou | G06T 7/00 |
| 2019/0355122 | A1* | 11/2019 | Zhang | G06T 7/90 |
| 2020/0007710 | A1* | 1/2020 | Omori | H04N 1/00251 |

FOREIGN PATENT DOCUMENTS

| | | |
|---|---|---|
| JP | 2015-118641 | 6/2015 |
| JP | 2016-126447 | 7/2016 |
| JP | 2017-091078 | 5/2017 |

OTHER PUBLICATIONS

EESR—Extended European Search Report dated Mar. 7, 2019 issued for corresponding European Patent Application No. 18196217. 6. **JP2015-118641 cited in the EESR was previously submitted in the IDS filed on Sep. 25, 2018.

* cited by examiner

FIG. 14

| EDGE LINE No. | ENDPOINT COORDINATES 1 | | ENDPOINT COORDINATES 2 | | ANGLE | DISTANCE FROM A SPECIFIC POINT | LINE-SEGMENT FEATURE QUANTITY |
|---|---|---|---|---|---|---|---|
| | x-COORDINATE | y-COORDINATE | x-COORDINATE | y-COORDINATE | | | |
| 1 | P1_1x | P1_1y | P1_2x | P1_2y | θ1 | d1 | (M1_1, M1_2, M1_3, ···, M1_n) |
| 2 | P2_1x | P2_1y | P2_2x | P2_2y | θ2 | d2 | (M2_1, M2_2, M2_3, ···, M2_n) |
| 3 | P3_1x | P3_1y | P3_2x | P3_2y | θ3 | d3 | (M3_1, M3_2, M3_3, ···, M3_n) |
| 4 | P4_1x | P4_1y | P4_2x | P4_2y | θ4 | d4 | (M4_1, M4_2, M4_3, ···, M4_n) |
| · | · | · | · | · | · | · | · |
| · | · | · | · | · | · | · | · |

143

FIG. 17
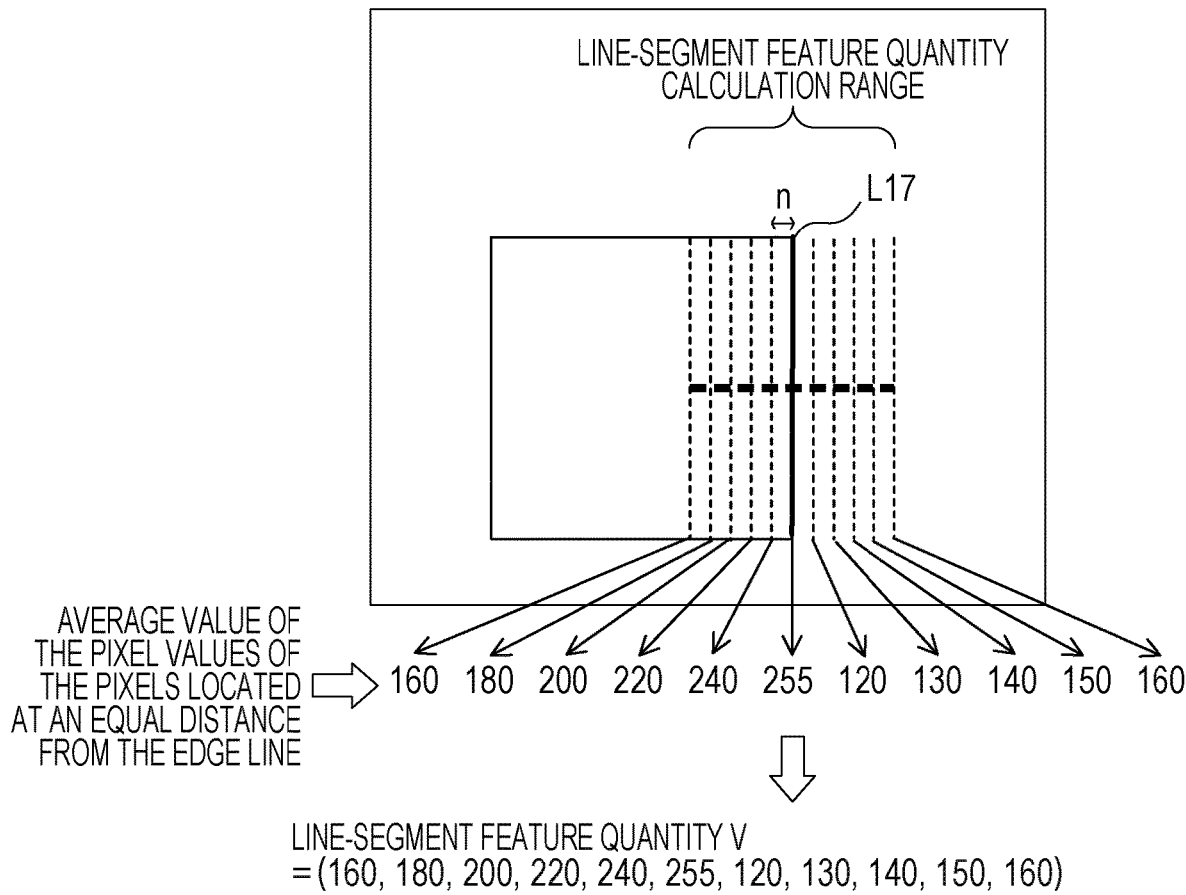
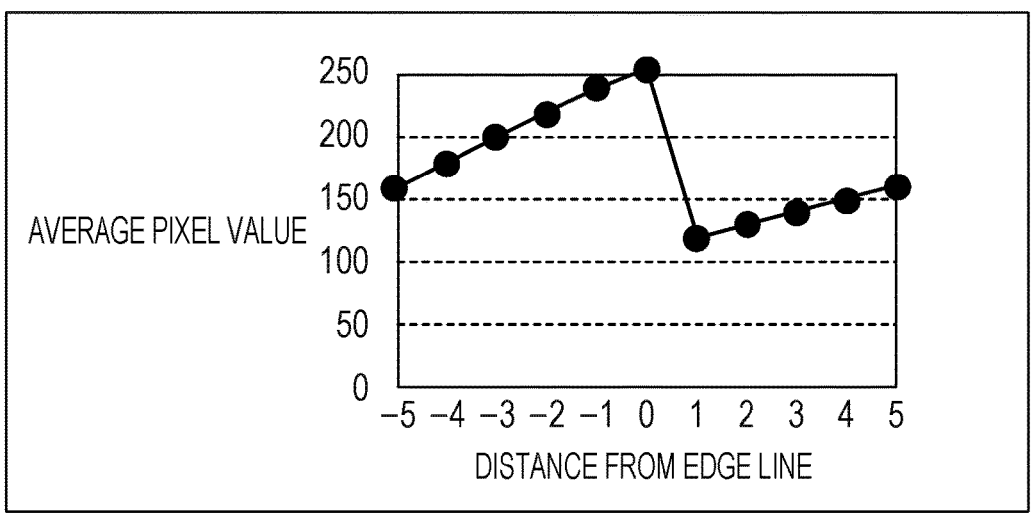

FIG. 20

| | 0 TO 45° | 90° OR LESS | 135° OR LESS | 180° OR LESS | 215° OR LESS | 270° OR LESS | 315° OR LESS | 360° OR LESS |
|---|---|---|---|---|---|---|---|---|
| | | | | ANGLE | | | | |
| LINE 1 | 0 | 0 | 8 | 0 | 0 | 0 | 0 | 0 |
| LINE 2 | 0 | 0 | 8 | 0 | 0 | 0 | 0 | 0 |
| LINE 3 | 0 | 2 | 0 | 4 | 6 | 0 | 8 | 0 |
| LINE 4 | 0 | 4 | 0 | 0 | 0 | 0 | 0 | 0 |
| LINE 5 | 0 | 4 | 0 | 0 | 0 | 0 | 0 | 0 |

CAPTURED IMAGE

THE IMMEDIATELY BEFORE FRAME

THE CURRENT FRAME

IMAGE PROCESSING METHOD AND IMAGE PROCESSING APPARATUS

CROSS-REFERENCE TO RELATED APPLICATION

This application is based upon and claims the benefit of priority of the prior Japanese Patent Application No. 2017-189661, filed on Sep. 29, 2017, the entire contents of which are incorporated herein by reference.

FIELD

The embodiments discussed herein are related to an image processing method and an image processing apparatus.

BACKGROUND

In recent years, systems that display images using augmented reality (AR) technology are becoming widespread. In an example of the AR technology, an image of an object is captured by a camera mounted on a personal computer (PC), a mobile terminal device, or the like, and the position and posture of the camera in a three-dimensional space is estimated from the image of the object. Content information is displayed superimposedly at any position in the image based on the determined position and posture of the camera.

As an application of AR technology, there is a technique for superimposedly displaying computer-aided design (CAD) data that indicates a three-dimensional shape of an object on an image.

A technique is known that associates edge lines extracted from a captured image of a three-dimensional structure with ridge lines included in a model image represented by model information of the three-dimensional structure and displays the model image superimposedly on the captured image such that the edge lines match the ridge lines (for example, refer to Japanese Laid-open Patent Publication No. 2017-91078).

FIG. 1 illustrates an image of an object, and FIG. 2 illustrates an example of CAD data representing the shape of the object in FIG. 1. FIG. 3 illustrates edge lines that are detected from the image in FIG. 1, and FIG. 4 illustrates an example in which the detected edge lines and contour lines (ridge lines) represented by the CAD data in FIG. 2 are associated.

First, as illustrated in FIG. 3, an image processing apparatus performs edge detection processing so as to detect edge lines from an image. Next, as illustrated in FIG. 4, the image processing apparatus displays contour lines represented by the CAD data and the detected edge lines in the image, and a user selects an edge line and a contour line using a mouse, or the like so as to associate those lines with each other.

Next, the image processing apparatus calculates the position and posture of the camera using combinations of the associated edge lines and contour lines. As illustrated in FIG. 5, the image processing apparatus superimposedly displays the contour lines represented by the CAD data on the image of the object to meet the calculated position and posture of the camera.

A technique is known that associates line segments with high precision when mapping and localization are performed (for example, refer to Japanese Laid-open Patent Publication No. 2015-118641). A technique is known that detects a line segment indicating a boundary of a plurality of paper surface areas in an image with high precision (for example, refer to Japanese Laid-open Patent Publication No. 2016-126447).

The other related-art techniques are disclosed in Japanese Laid-open Patent Publication Nos. 2015-40827 and 2012-53617.

SUMMARY

According to an aspect of the invention, an image processing method includes detecting a plurality of line segments that indicate edges of an object, based on changes of pixel values of a plurality of pixels included in an input image, wherein each of the plurality of line segments is included in an input image, calculating a first feature quantity that includes a plurality of feature quantities for indicating features of individual pixel values of a plurality of pixels located in a first direction perpendicular to a first line segment out of the plurality of line segments and a plurality of feature quantities for indicating features of individual pixel values of a plurality of pixels located in a second direction opposite to the first direction with respect to the first line segment, calculating, based on pixel values of pixels located for each predetermined distance in a third direction perpendicular to a second line segment out of the plurality of line segments and pixel values of pixels located for each of the predetermined distance in a fourth direction opposite to the third direction with respect to the second line segment, a second feature quantity that includes a plurality of feature quantities for indicating individual features of the pixels located for each of the predetermined distance from the second line segment, and determining to integrate the first line segment and the second line segment, based on the first feature quantity and the second feature quantity, by a processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is an example of edge line information.

FIG. 17 is an explanatory diagram of calculation of a line-segment feature quantity;

FIG. 20 is a diagram illustrating the sum for each line of the eight-direction gradient histograms of each sample point for each 45 degrees;

DESCRIPTION OF EMBODIMENTS

When edge lines are detected from an image, a suitable edge line is not sometimes detected by the related-art edge line detection method.

When association is performed with a contour line represented by CAD data using unsuitable edge line detected from an image, the precision of the position and posture of a camera estimated in a three-dimensional space sometimes deteriorates.

In the following, a description will be given of embodiments of a technique for improving the detection precision of a line segment indicating an edge of an object in an image with reference to the drawings. First, a description will be given of the detection and integration processing of an edge line according to a comparative example. An edge line is a line segment that indicates an edge of an object.

FIGS. 6 to 9 are explanatory diagrams of detection and integration processing of edge lines in a comparative example.

It is assumed that an image to be processed includes a quadrilateral object 20 and a triangular object 30. An image processing apparatus detects edge lines by the following operation.

Operation 1 The image processing apparatus extracts a part having a larger shading change (change in pixel values) than a predetermined threshold value in an image as a candidate for an edge line.

Figure 1:
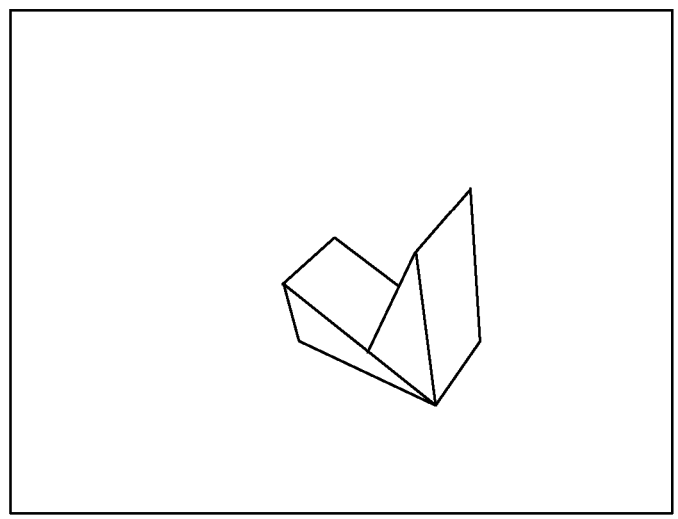
FIG. 1 is a diagram illustrating an image of an object.
Figure 2:
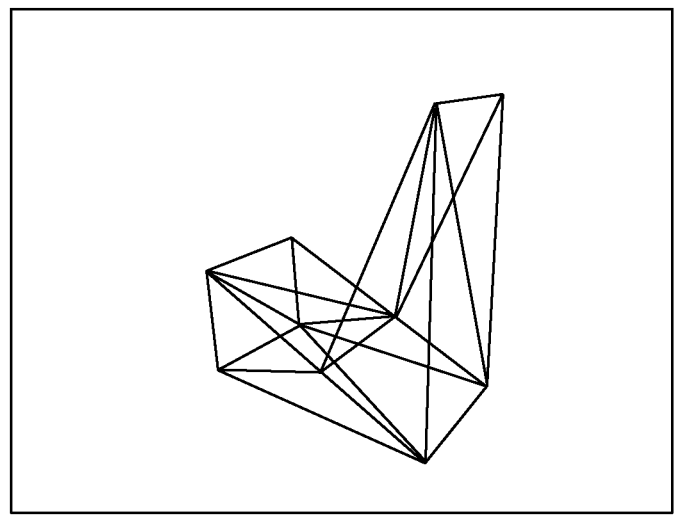
FIG. 2 is a diagram illustrating CAD data.
Figure 3:
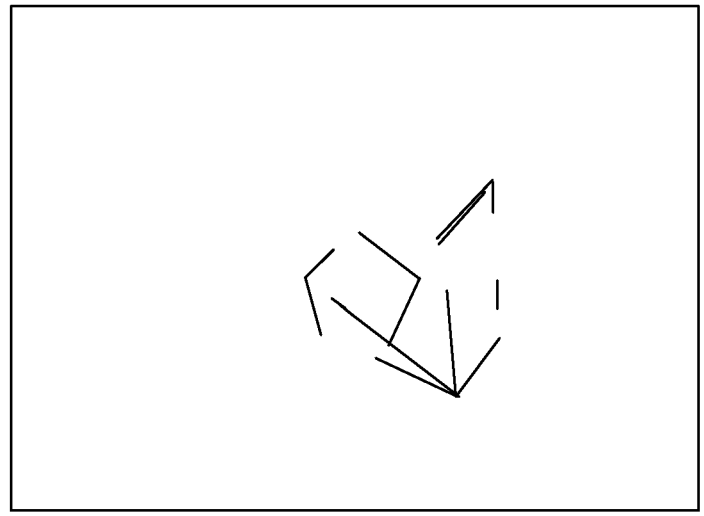
FIG. 3 is a diagram illustrating edge lines detected from the image.
Figure 4:
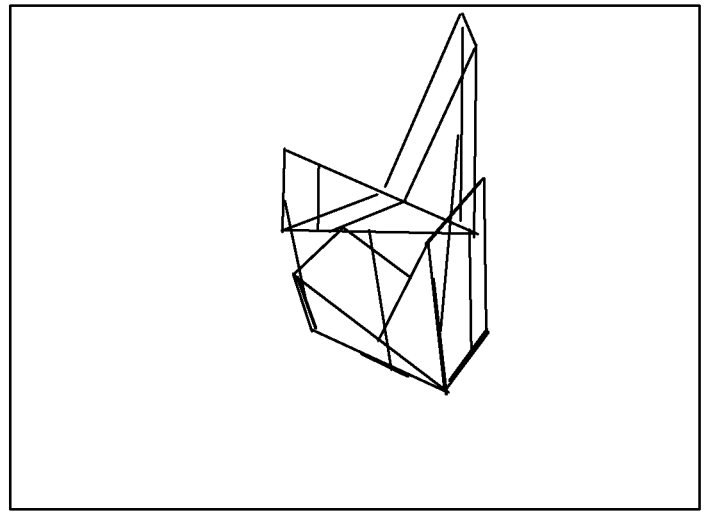
FIG. 4 is an explanatory diagram of associating edge lines with contour lines.
Figure 5:
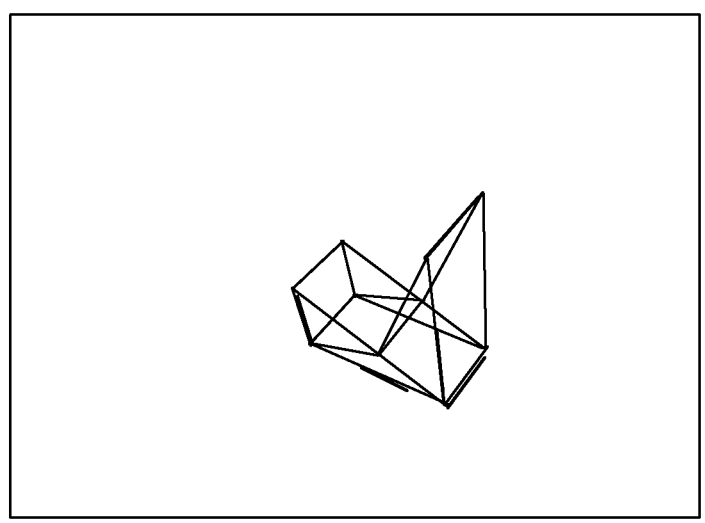
FIG. 5 is a diagram illustrating an example of superimposed display.
Figure 6:
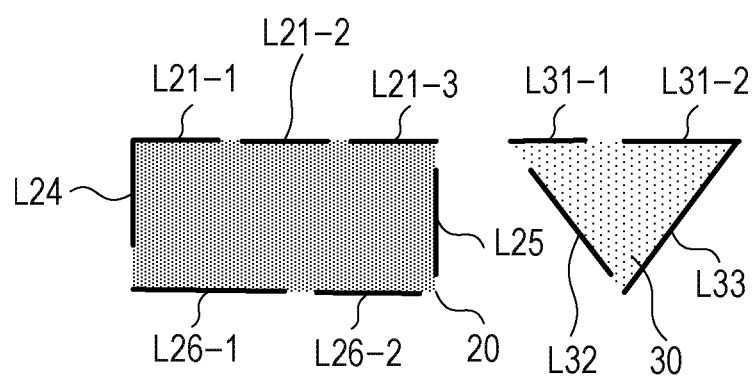
FIG. 6 is an explanatory diagram of detection and integration processing of edge lines in a comparative example.

Operation 2 The image processing apparatus integrates the candidates that are adjacent and have a similar shading change direction, and detects them as a line segment. Hereinafter a candidate integrated by the processing of the operation 2 is referred to as an edge line. At this point in time, the edge line is a collection of very finely separated line segments. In FIG. 6, edge lines L21-1, L21-2, L21-3, L24, L25, L26-1, and L26-2 are detected as edge lines of the object 20. Edge lines L31-1, L31-2, L32, and L33 are detected as edge lines of the object 30.

Operation 3 The image processing apparatus integrates edge lines that satisfy the following conditions (i) to (iii) as the same edge line (integration processing of edge lines). That is to say, a plurality of edge lines that have been determined as the same edge line are connected to generate one edge line.

(i) The direction of the edge line is within the range of a predetermined threshold value. A direction of the edge line is, for example, an angle of the edge line with respect to the x-axis direction of the image.

(ii) The distance from a specific point in the image to the edge line within the range of a predetermined threshold value. In this regard, it is assumed that the distance from a specific point to an edge line is the length of a perpendicular line from the specific point to an extended line of the edge line.

Edge lines that satisfy the above-described conditions (i) and (ii) are determined to be disposed in the same line.

(iii) The distance between endpoints of the edge line is less than or equal to a predetermined threshold value.

Hereinafter in order to distinguish an edge line before having been integrated and an integrated edge line, an integrated edge line is referred to as an integrated edge line.

Here, a description will be given of an example in which edge lines L21-1, L21-2, and L21-3 in FIG. 6 are integrated so that an integrated edge line L21 is generated.

First, the image processing apparatus detects an edge line that satisfies the condition (i).

In FIG. 6, the direction of the edge lines L21-1, L21-2, L21-3, L26-1, L26-2, L31-1, and L31-2 is the horizontal (x-axis) direction in FIG. 6. For example, the angles of the edge lines L21-1, L21-2, L21-3, L26-1, L26-2, L31-1, and L31-2 are 0 degrees. Also, it is assumed that the angles of the edge line L24, L25, L32, L33 are larger than α degrees. The image processing apparatus detects edge lines having an edge line angle within a range (for example, ±α°) of a predetermined threshold value. In FIG. 6, the edge lines L21-1, L21-2, L21-3, L26-1, L26-2, L31-1, and L31-2 are detected.

Figure 7:
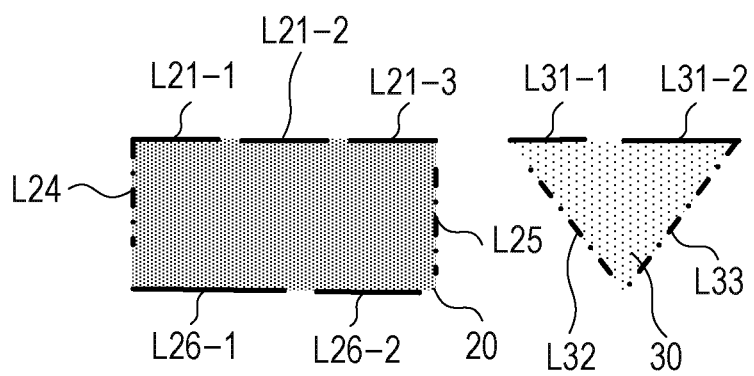
FIG. 7 is an explanatory diagram of detection and integration processing of edge lines in a comparative example.
Figure 8:
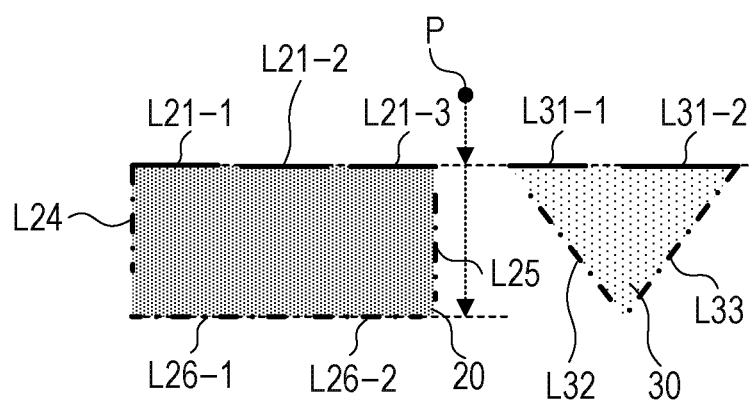
FIG. 8 is an explanatory diagram of detection and integration processing of edge lines in a comparative example.
Figure 9:
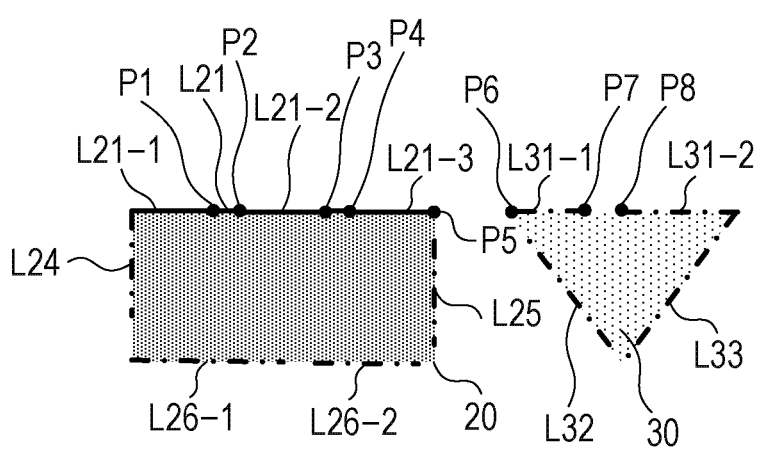
FIG. 9 is an explanatory diagram of detection and integration processing of edge lines in a comparative example.

As illustrated in FIG. 7, the edge lines L21-1, L21-2, L21-3, L26-1, L26-2, L31-1, and L31-2 become candidates of edge lines that satisfy the condition (i) and are to be integrated. In FIGS. 7 to 9, the candidates of the edge lines to be integrated are illustrated by solid lines, and the edge lines other than the candidates of the edge lines to be integrated are illustrated by dash-dotted lines. In FIG. 7, the edge lines L21-1, L21-2, L21-3, L26-1, L26-2, L31-1, and L31-2 are illustrated by solid lines, and the edge lines L24, L25, L32, and L33 are illustrated by dash-dotted lines.

Next, the image processing apparatus detects edge lines that satisfy the condition (ii) out of the edge lines that satisfy the condition (i).

The image processing apparatus obtains respective distances from a specific point P to the edge lines L21-1, L21-2, L21-3, L26-1, L26-2, L31-1, and L31-2.

In FIG. 8, an extended line of the edge lines L21-1, L21-2, L21-3, L31-1 and L31-2 is illustrated by a broken line on the upper side. An extended line of the edge lines L26-1 and L26-2 is illustrated by a broken line on the lower side.

It is assumed that the respective distances from the specific point P to the edge lines L21-1, L21-2, L21-3, L31-1, and L31-2 are within a range (for example, d1±β) of a predetermined threshold value. Also, the respective distances from the specific point P to the edge lines L26-1 and L26-2 are not within the range (for example, d1±β) of the predetermined threshold value.

Accordingly, the edge lines L21-1, L21-2, L21-3, L31-1, and L31-2 become the candidates of edge lines that satisfy the conditions (i) and (ii). That is to say, the edge lines L21-1, L21-2, L21-3, L31-1, and L31-2 are disposed in the same line.

In this regard, the respective distances from the specific point P to the edge lines L26-1 and L26-2 are within a range (for example, d2±β) of another predetermined threshold value, and thus the edge lines L26-1 and L26-2 become the candidates of the edge lines that satisfy the conditions (i) and (ii). That is to say, the edge lines L26-1 and L26-2 are disposed in the same line. Here, attention is given to the edge lines L21-1, L21-2, and L21-3, a description will be omitted of the integration processing of the edge lines L26-1 and L26-2.

Next, the image processing apparatus detects an edge line that satisfies the condition (iii) out of the edge lines that satisfy the conditions (i) and (ii).

The image processing apparatus obtains the distance between endpoints of adjacent edge lines. In FIG. 9, the image processing apparatus obtains the distance D1 between an endpoint P1 of the edge line L21-2 side of the edge line L21-1 and an endpoint P2 of the edge line L21-1 side of the edge line L21-2. The image processing apparatus obtains the distance D2 between an endpoint P3 of the edge line L21-3 side of the edge line L21-2 and an endpoint P4 of the edge line L21-2 side of the edge line L21-3. The image processing apparatus obtains the distance D3 between an endpoint P5 of the edge line L31-1 side of the edge line L21-3 and an endpoint P6 of the edge line L21-3 side of the edge line L31-1.

Here, it is assumed that the distances D1 and D2 are less than or equal to a predetermined threshold value, and the distance D3 is greater than a predetermined threshold value. Accordingly, the edge lines L21-1, L21-2, and L21-3 satisfy the conditions (i), (ii), and (iii), and thus the image processing apparatus connects the edge lines L21-1, L21-2, and L21-3 to generate an integrated edge line L21.

Further, the image processing apparatus obtains the distance D4 between an endpoint P7 of the edge line L31-2 side of the edge line L31-1 and an endpoint P8 of the edge line L31-1 side of the edge line L31-2. If the distance D4 is less than or equal to the predetermined threshold value, the image processing apparatus integrates the edge line L31-1 and the edge line L31-2.

By the above-described operations 1 to 3, an integrated edge line is generated by integrating a plurality of edge lines.

Next, the case where an integrated edge line that indicates an edge of an object is not suitably detected is illustrated.

Figure 10:
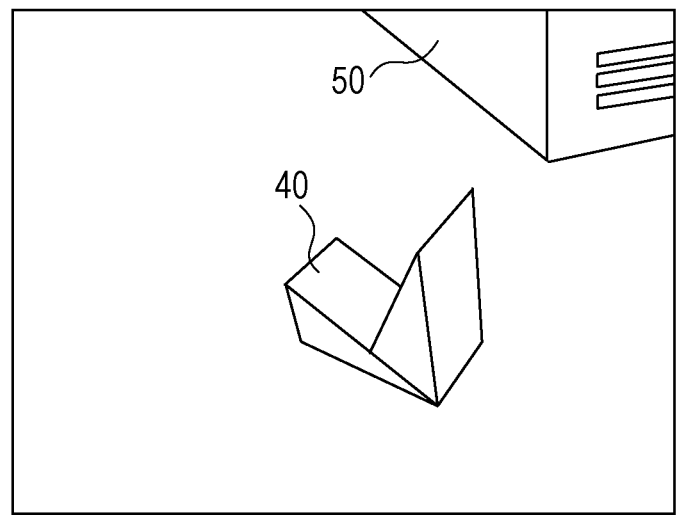
FIG. 10 is a diagram illustrating an image of objects.
Figure 11:
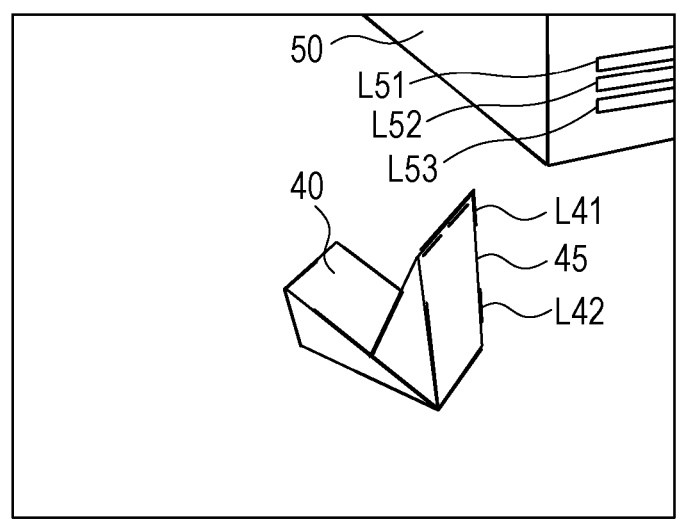
FIG. 11 is a diagram illustrating edge lines detected from the image.

Here, a description will be given of the case where edge lines in an image including an object 40 and an object 50 illustrated in FIG. 10 are detected and integrated. When the image processing apparatus performs the operations 1 and 2 of the edge-line detection and integration processing in the comparative example on the image in FIG. 10, edge lines as illustrated in FIG. 11 are obtained. In FIG. 11, the image illustrated in FIG. 10 and the detected edge lines are overlappingly displayed, and the edge lines are indicated by bold lines.

As illustrated in FIG. 11, an edge line L41 and an edge line L42 are detected on an edge 45 of the object 40. When edge lines are detected based on a shading change in an image, one edge line does not have to be detected on one edge, and as illustrated in FIG. 11, separated edge lines L41 and L42 are sometimes obtained.

Also, the object 50 includes three exhaust openings 51 to 53, and edge lines L51 to L53 are detected as edge lines of the exhaust openings 51 to 53 respectively.

Figure 12:
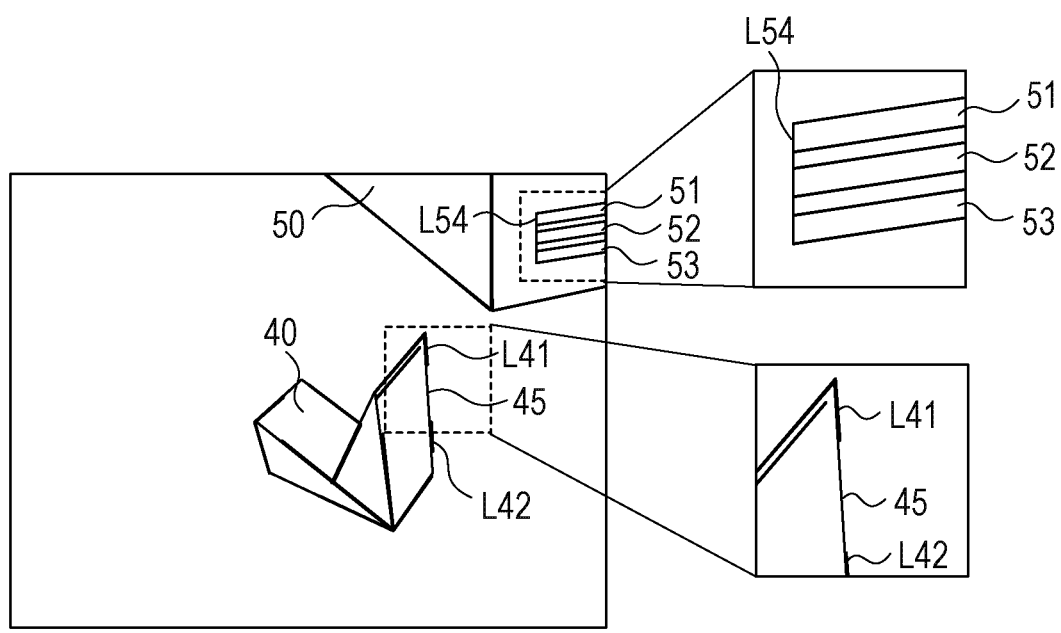
FIG. 12 is a diagram illustrating an integrated edge line.

When the image processing apparatus performs the operation 3 of the edge-line detection and integration processing according to the comparative example on the detected edge lines, edge lines (including integrated edge lines) as illustrated in FIG. 12 are obtained.

In FIG. 11, the distance between the endpoints of the edge lines L41 and L42 is greater than a predetermined threshold value, and thus, in FIG. 12, the edge lines L41 and L42 are not integrated and remain as they are. However, the edge lines L41 and L42 are parts of an edge line indicating the edge 45, and thus are desirable to be integrated.

Also, the distance between the endpoints of the edge lines L51 and L52 is less than or equal to a predetermined threshold value, and the distance between the endpoints of the edge lines L52 and L53 is less than or equal to the predetermined threshold value, and thus an integrated edge line L54 is obtained by integrating the edge lines L51 to L53 in FIG. 12. However, the edge lines L51 to L53 indicate the respective edges of the different exhaust openings 51 to 53, and thus the edge lines L51 to L53 are not to be integrated.

In the edge-line integration processing in the operation 3 in the edge-line detection and integration processing according to the above-described comparative example, there are cases where depending on a threshold value to be used, separate edge lines of different objects are integrated into one edge line, or a plurality of edge lines detected on one edge of the same object are not integrated into one edge line. In this manner, in the edge-line detection and integration processing according to the comparative example, a suitable integrated edge line is not sometimes obtained.

Figure 13:
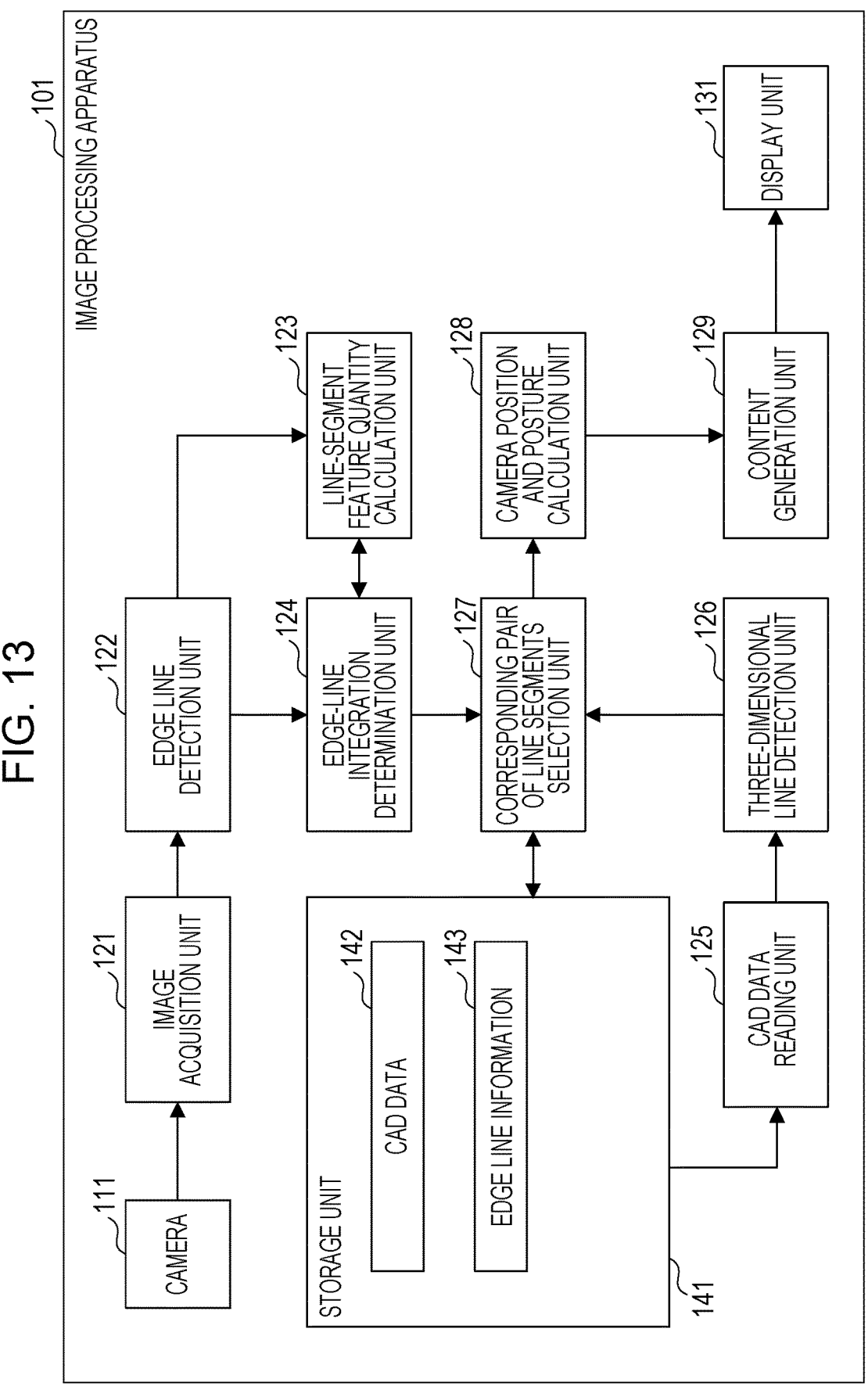
FIG. 13 is the configuration diagram of an image processing apparatus according to an embodiment.

FIG. 13 is the configuration diagram of an image processing apparatus according to an embodiment. An image processing apparatus 101 includes a camera 111, an image acquisition unit 121, an edge-line detection unit 122, a line-segment feature quantity calculation unit 123, an edge-line integration determination unit 124, a CAD data reading unit 125, a three-dimensional line detection unit 126, a corresponding pair of line segments selection unit 127, a camera position and posture calculation unit 128, a content generation unit 129, a display unit 131, and a storage unit 141. The image processing apparatus 101 is, for example, a personal computer, a mobile phone, a mobile terminal, or the like. The edge-line detection unit 122 is an example of the detection unit. The line-segment feature quantity calculation unit 123 is an example of the feature quantity calculation unit. The edge-line integration determination unit 124 is an example of the determination unit.

The storage unit 141 stores CAD data 142 and edge line information 143. The CAD data 142 is model information representing a three-dimensional CAD model of an object included in a captured image and includes vertex information of a plurality of vertices included in the three-dimensional CAD model and line segment information of a plurality of line segments.

FIG. 14 is an example of edge line information.

The edge line information 143 is information of the edge lines detected from the captured image. The edge line information 143 includes edge line No., endpoint coordinates 1, endpoint coordinates 2, angle, the distance from a specific point, and line-segment feature quantity as items. In the edge line information 143, edge line No., endpoint coordinates 1, endpoint coordinates 2, angle, the distance from a specific point, and line-segment feature quantity are recorded in association with each other.

The edge line No. is a unique number that is assigned to a detected edge line and that identifies an edge line. The endpoint coordinates 1 are an x-coordinate and a y-coordinate of one of the endpoints of an edge line.

The endpoint coordinates 2 are an x-coordinate and a y-coordinate of the other of the endpoints of the edge line. The angle is an angle of the edge line with respect to the x-axis. The distance from a specific point is the distance from a specific point to an edge line in a captured image. It is assumed that the distance from a specific point to an edge line is the length of a perpendicular line from the specific point to a line produced by extending the edge line.

The line-segment feature quantity is a value indicating the feature of an edge line that is calculated from an edge line and the surrounding pixels of the edge line. The details of a line-segment feature quantity will be described later.

Figure 15:
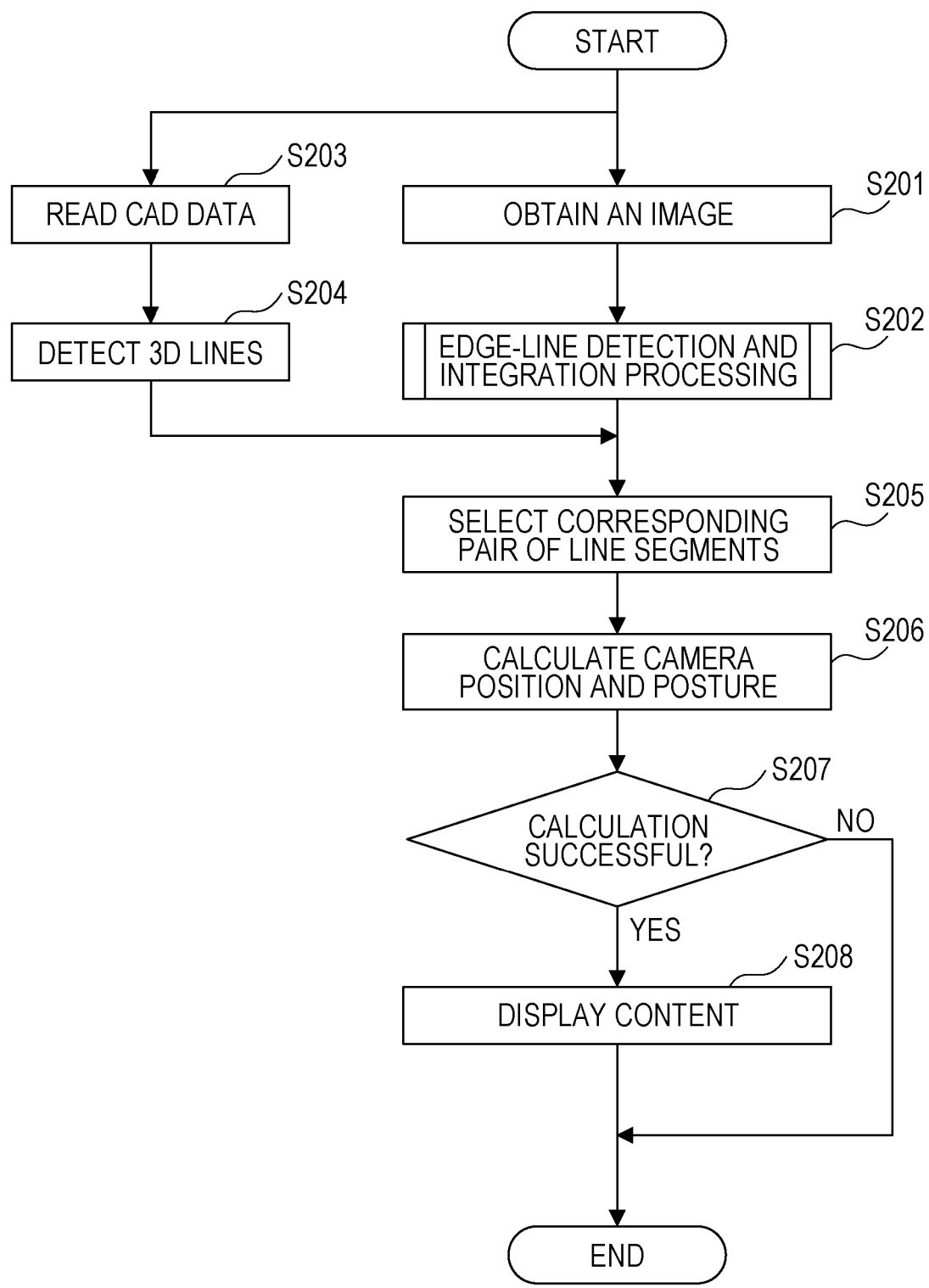
FIG. 15 is a flowchart of an image processing method according to the embodiment.

FIG. 15 is a flowchart of an image processing method according to the embodiment.

In operation S201, the image acquisition unit 121 obtains an image captured by the camera 111 from the camera 111.

In operation S202, the edge detection unit 122, the line-segment feature quantity calculation unit 123, and the edge-line integration determination unit 124 perform edge-line detection and integration processing. The details of the edge-line detection and integration processing will be described later. The edge-line detection and integration processing detects edge lines from the captured image and integrates edge lines that satisfy predetermined conditions out of the detected edge lines to generate an integrated edge line.

In operation S203, the CAD data reading unit 125 reads CAD data 203 from the storage unit 141.

In operation S204, the three-dimensional line detection unit 126 detects 3D lines from the CAD data 203. A 3D line is a contour line (ridge line) of a three-dimensional model of an object represented by CAD data 203. For example, the three-dimensional line detection unit 126 extracts only line segments that indicate the outer shape feature of the three-dimensional CAD model from a plurality of line segments included in the CAD data 203 and uses the extracted line segments as contour lines.

The above-described operations S201 and S202, and the operations S203 and 204 are performed in parallel. In this regard, the operations S201 and S202, and the operations S203 and 204 may be performed in series. After the operations S201 to S204 are completed, the operation 205 is performed.

In operation S205, the image processing device 101 displays the contour lines indicated by the CAD data 142 and the edge lines having been subjected to the integration processing on the display unit 131. The edge lines having been subjected to the integration processing includes integrated edge lines produced by integrating edge lines that satisfy predetermined conditions, and edge lines that do not satisfy the predetermined conditions and are not integrated. The user selects a displayed contour line and an edge line using a mouse, or the like. The corresponding pair of line segments selection unit 127 associates the selected contour line and edge line.

In operation S206, the camera position and posture calculation unit 128 calculates the position and posture of the camera 111 using combinations of the associated edge lines and contour lines.

In operation S207, if the camera position and posture calculation unit 128 calculates the position and posture of the camera 111, the control proceeds to operation S208. If the camera position and posture calculation unit 128 fails in calculating the position and posture of the camera 111, the processing is terminated.

In operation S208, the content generation unit 129 generates content based on the calculation result by the camera position and posture calculation unit 128 and displays the generated content on the display unit 131. For example, the content generation unit 129 generates an image in which contour lines indicated by the CAD data 142 are superimposed on the captured image based on the camera position and posture calculation unit 128 and displays the generated image on the display unit 131.

Next, a description will be given of the details of the edge-line detection and integration processing. In an image processing method according to the embodiment, the edge-line detection and integration processing uses any one of the first to third edge-line detection and integration processing or any combination thereof.

First-Edge-Line Detection and Integration Processing

Figure 16:
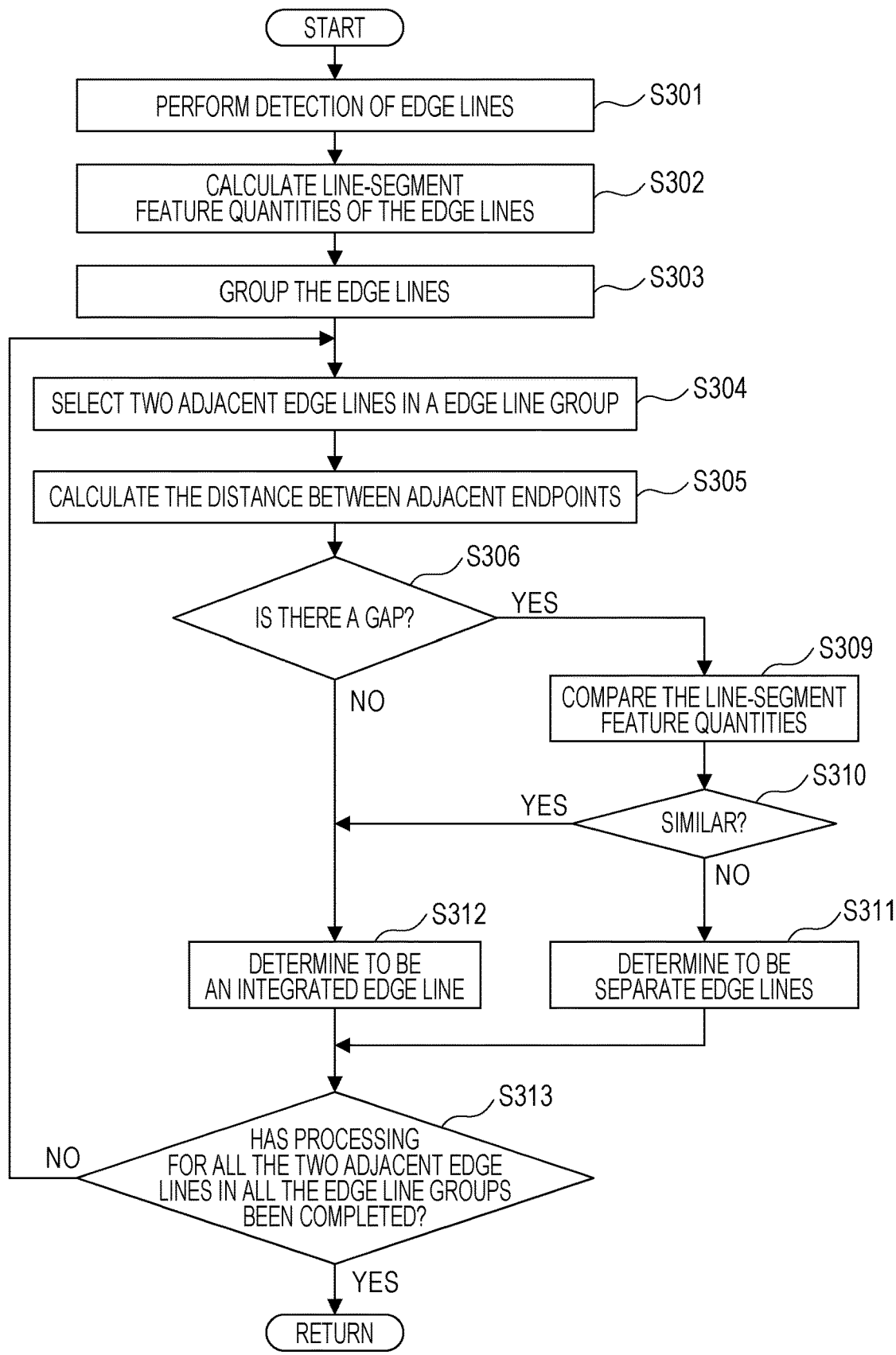
FIG. 16 is a detail flowchart of first-edge-line detection and integration processing.

FIG. 16 is a detail flowchart of the first-edge-line detection and integration processing. The processing in FIG. 16 corresponds to the operation S202 in FIG. 15.

In operation S301, the edge-line detection unit 122 detects edge lines from the captured image. Specifically, the edge-line detection unit 122 extracts a part having a larger shading change (change in pixel values) than a predetermined threshold value in the captured image as a candidate for an edge line. The edge-line detection unit 122 integrates candidates that are adjacent and have a similar shading change direction and detects them as a line segment (edge line). That is to say, the same processing as that of the operations 1 and 2 of the edge-line detection and integration processing according to the comparative example is performed.

In operation S302, the line-segment feature quantity calculation unit 123 calculates the edge-line line-segment feature quantity. The line-segment feature quantity calculation unit 123 records edge line information (edge line No., endpoint coordinates 1, endpoint coordinates 2, angle, the distance from a specific point, and line-segment feature quantity) in the edge line information 143. Here, a description will be given of a line-segment feature quantity.

FIG. 17 is an explanatory diagram of calculation of a line-segment feature quantity.

A line-segment feature quantity includes the average value of the pixels in the edge line and the average value of the pixel values in the edge line located at the place where the edge line is translated for m (m=1 to p) times for each predetermined distance n (n is a positive number) in both of the vertical directions with respect to the edge line. Out of the two vertical directions with respect to the edge line, one is assumed to be a positive direction, and the other is assumed to be a negative direction. For example, in FIG. 17, an edge line L17 is located in the longitudinal direction, and out of the vertical directions with respect to the edge line L17, the right direction is assumed to be a positive vertical direction, and the left direction is assumed to be a negative vertical direction.

A rectangular area that includes pixels located at the place a distance n*p apart from the edge line in the positive vertical direction and pixels located at the place a distance n*p apart from the edge line in the negative vertical direction is referred to as a line-segment feature quantity calculation range.

The line-segment feature quantity calculation unit 123 calculates the average value of the pixels in the edge line, and the average value of the pixel values of the pixels located at the places where the edge line is translated for m (m=1 to p) times for each predetermined distance n in both of the vertical directions with respect to the edge line. The line-segment feature quantity calculation unit 123 arranges a plurality of average values in the order of the average value of the pixels located at the place a distance n*p apart from the edge line in the negative vertical direction, the average value of the pixels located at the place a distance n*(p-1) apart from the edge line in the negative vertical direction, . . . , the average value of the pixels located at the place a distance n apart from the edge line in the negative vertical direction, the average value of the pixels in the edge line, the average value of the pixels located at the place a distance n apart from the edge line in the positive vertical direction, the average value of the pixels located at the place a distance 2n apart from the edge line in the positive vertical direction, . . . , and the average value of the pixels located at the place a distance n*p apart from the edge line in the positive vertical direction to obtain a line-segment feature quantity V.

In FIG. 17, when line-segment feature quantity of the edge line L17 is obtained, calculation is performed of the average value of the pixels of the edge line L17 and the average value of the pixel values of the pixels located at the places where the edge line L17 is translated for m (m=1 to 5) times for each predetermined distance n (n is a positive number) in both of the vertical directions with respect to the edge line L17.

In FIG. 17, the average value of the pixels located at the place a distance 5n apart from the edge line L17 in the negative vertical direction is 160. The average value of the pixels located at the place a distance 4n apart from the edge line L17 in the negative vertical direction is 180. The average value of the pixels located at the place a distance 3n apart from the edge line L17 in the negative vertical direction is 200. The average value of the pixels located at the place a distance 2n apart from the edge line L17 in the negative vertical direction is 220. The average value of the pixels located at the place a distance n apart from the edge line L17 in the negative vertical direction is 240. The average value of the pixels in the edge line L17 is 255. The average value of the pixels located at the place a distance n apart from the edge line L17 in the positive vertical direction is 120. The average value of the pixels located at the place a distance 2n apart from the edge line L17 in the positive vertical direction is 130. The average value of the pixels located at the place a distance 3n apart from the edge line L17 in the positive vertical direction is 140. The average value of the pixels located at the place a distance 4n apart from the edge line L17 in the positive vertical direction is 150. The average value of the pixels located at the place a distance 5n apart from the edge line L17 in the positive vertical direction is 160.

Accordingly, the line-segment feature quantity V of the edge line in FIG. 17 becomes V=(160, 180, 200, 220, 240, 255, 120, 130, 140, 150, 160). When the line-segment feature quantity V is plotted on a graph, the result becomes as illustrated in the lower part in FIG. 17.

Also, it is possible to use the line segment descriptor (Line-based Eight-directional Histogram Feature (LEHF) described in Japanese Laid-open Patent Publication No. 2015-118641 as a line-segment feature quantity. Here, a description will be given of LEHF described in Japanese Laid-open Patent Publication No. 2015-118641.

Figure 18:
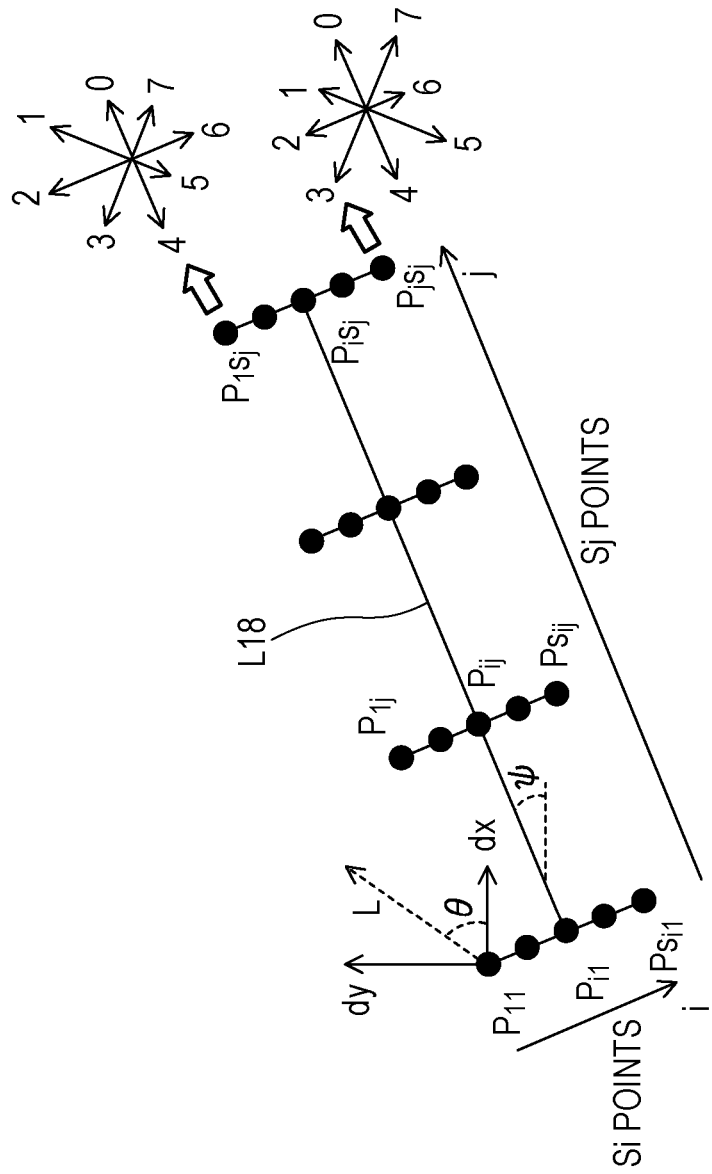
FIG. 18 is an explanatory diagram of an example of a calculation method of LEHF.

FIG. 18 is an explanatory diagram of an example of a calculation method of LEHF described in Japanese Laid-open Patent Publication No. 2015-118641.

Next, a description will be given of the processing in which the line-segment feature quantity calculation unit 123 detects the feature of a line segment, which is an edge line detected from the image data. When the line-segment feature quantity calculation unit 123 detects the feature of a line segment, the line-segment feature quantity calculation unit 123 calculates LEHF. In the following, a description will be given of the calculation processing of LEHF.

The line-segment feature quantity calculation unit 123 calculates differential values in the surrounding areas of a line segment and calculates a gradient vector based on the individual differential values. The line-segment feature quantity calculation unit 123 adds gradient vectors in accordance with the line direction so as to calculate a plurality of gradient histograms to obtain LEHF. In particular, the line-segment feature quantity calculation unit 123 determines the definition of the gradient direction and the arrangement order of the gradient histogram so as to correspond to the line segment direction to give the directional dependency to the feature of the line segment.

The line-segment feature quantity calculation unit 123 takes a certain number of sample points in the surroundings of the line segment in order to calculate LEHF stably at high speed and performs differential calculation on the sample points. Also, in order to obtain rotational invariance, the line-segment feature quantity calculation unit 123 defines an angle formed by the gradient direction of the gradient vector calculated on the sample point and the line segment as a gradient direction once again. The image data itself is not subjected to rotation calculation in order to obtain rotational invariance, and thus it becomes possible to shorten the processing time.

In FIG. 18, a description will be given of the case where LEHF of a line segment L18 in the image data is calculated. The line-segment feature quantity calculation unit 123 takes sample points $P_{11}$ to $PS_iS_j$ evenly in the surroundings of the line segment L18. In FIG. 18, $S_j$ is the number of sample points taken in the j-direction, and $S_i$ is the number of sample points taken in the i-direction. The j-direction is a direction parallel to the line segment L18, and the i-direction is a direction orthogonal to the line segment L18.

Here, it is assumed that each sample point is $p_{ij}$ ($px_{ij}$, $py_{ij}$). In LEHF, the gradient direction histogram is used as a feature quantity, and thus differential calculation is performed for each sample point. The line-segment feature quantity calculation unit 123 calculates the differential value $dx_{ij}$ of the brightness of the pixel at a sample point $p_{ij}$ in the x-direction by the expression (1). The line-segment feature quantity calculation unit 123 calculates the differential value $dy_{ij}$ of the brightness of the pixel at the sample point $p_{ij}$ in the y-direction value by the expression (2). $I(px_{ij}, py_{ij})$ in the expressions (1) and (2) denote the brightness values of the pixel at the coordinates ($px_{ij}$, $py_{ij}$) in the image data.

The line-segment feature quantity calculation unit 123 calculates a gradient vector having a gradient strength $L_{ij}$ and a gradient direction $\theta_{ij}$ based on the differential values $dx_{ij}$ and $dy_{ij}$. The line-segment feature quantity calculation unit 123 calculates a gradient strength $L_{ij}$ based on the expression (3). The line-segment feature quantity calculation unit 123 calculates a gradient direction $\theta_{ij}$ based on the expression (4).

$$dx_{ij}=I(px_{ij}+1,py_{ij})-I(px_{ij}-1,py_{ij}) \quad (1)$$

$$dy_{ij}=I(px_{ij},py_{ij}+1)-I(px_{ij},py_{ij}-1) \quad (2)$$

$$L_{ij}=\sqrt{(dx_{ij}^2+dy_{ij}^2)} \quad (3)$$

$$\theta_{ij}=\arctan(dy_{ij}/dx_{ij}) \quad (4)$$

After the line-segment feature quantity calculation unit 123 calculates the gradient vector, the line-segment feature quantity calculation unit 123 calculates an eight-directional gradient histogram for each sample point based on the gradient vector. The eight-directional gradient histogram $h_i$ of a certain sample point is illustrated in the expression (5). After the line-segment feature quantity calculation unit 123 corrects the gradient vector e in accordance with whether or not the line segment of which eight-directional gradient histogram is to be calculated has a forward direction, the line-segment feature quantity calculation unit 123 performs the following processing. If the line segment has a backward direction, the line-segment feature quantity calculation unit 123 performs correction to subtract $\pi$ from the gradient vector v. A description will be given later of the processing in which the line-segment feature quantity calculation unit 123 determines whether or not the line segment has a forward direction.

$$h_i=(h_{i,0},h_{i,1},h_{i,2},h_{i,3},h_{i,4},h_{i,5},h_{i,6},h_{i,7}) \quad (5)$$

If the gradient direction of the gradient vector is "equal to or higher than 0 and less than $\pi/4$", the line-segment feature quantity calculation unit 123 stores the gradient strength of the gradient vector in "$h_{i,0}$" and stores 0 in "$h_{i,1}, h_{i,2}, h_{i,3}, h_{i,4}, h_{i,5}, h_{i,6}, h_{i,7}$". If the gradient direction of the gradient vector is "equal to or higher than $\pi/4$ and less than $\pi/2$", the line-segment feature quantity calculation unit 123 stores the gradient strength of the gradient vector in "$h_{i,1}$", and stores 0 in "$h_{i,0}, h_{i,2}, h_{i,3}, h_{i,4}, h_{i,5}, h_{i,6}, h_{i,7}$". If the gradient direction of the gradient vector is "equal to or higher than $\pi/2$ and less than $3\pi/4$", the line-segment feature quantity calculation unit 123 stores the gradient strength of the gradient vector in "$h_{i,2}$" and stores 0 in "$h_{i,0}, h_{i,1}, h_{i,3}, h_{i,4}, h_{i,5}, h_{i,6}, h_{i,7}$".

If the gradient direction of the gradient vector is "equal to or higher than $3\pi/4$ and less than $\pi$", the line-segment feature quantity calculation unit 123 stores the gradient strength of the gradient vector in "$h_{i,3}$" and stores 0 in "$h_{i,0}, h_{i,1}, h_{i,2}, h_{i,4}, h_{i,5}, h_{i,6}, h_{i,7}$". If the gradient direction of the gradient vector is "equal to or higher than $\pi$ and less than $5\pi/4$", the line-segment feature quantity calculation unit 123 stores the gradient strength of the gradient vector in "$h_{i,4}$" and stores 0 in "$h_{i,0}, h_{i,1}, h_{i,2}, h_{i,3}, h_{i,5}, h_{i,6}, h_{i,7}$".

If the gradient direction of the gradient vector is "equal to or higher than $5\pi/4$ and less than $3\pi/2$", the line-segment feature quantity calculation unit 123 stores the gradient strength of the gradient vector in "$h_{i,5}$" and stores 0 in "$h_{i,0}, h_{i,1}, h_{i,2}, h_{i,3}, h_{i,4}, h_{i,6}, h_{i,7}$". If the gradient direction of the gradient vector is "equal to or higher than $3\pi/2$ and less than $7\pi/4$", the line-segment feature quantity calculation unit 123 stores the gradient strength of the gradient vector in "$h_{i,6}$" and stores 0 in "$h_{i,0}, h_{i,1}, h_{i,2}, h_{i,3}, h_{i,4}, h_{i,5}, h_{i,7}$". If the gradient direction of the gradient vector is "equal to or higher than $7\pi/4$ and less than $2\pi$", the line-segment feature quantity calculation unit 123 stores the gradient strength of the gradient vector in "$h_{i,7}$" and stores 0 in "$h_{i,0}, h_{i,1}, h_{i,2}, h_{i,3}, h_{i,4}, h_{i,5}, h_{i,6}$".

Here, after the line-segment feature quantity calculation unit 123 calculates an eight-directional gradient histogram for each sample point based on the expression (5), the line-segment feature quantity calculation unit 123 arranges the eight-directional gradient histogram for each i so as to obtain LEHF.

If the line segment direction is the forward direction, the line-segment feature quantity calculation unit 123 arranges the eight-directional array histogram in accordance with the expression (6). Also, if the line segment direction is the backward direction, the line-segment feature quantity calculation unit 123 arranges the eight-directional array histogram in accordance with the expression (7).

$$\text{LEHF}=(h_1,h_2,h_3,h_4,\ldots,h_{Si}) \quad (6)$$

$$\text{LEHF}=(h_{Si},h_{Si-1},\ldots,h_1) \quad (7)$$

For example, if the distance between the sample points $p_{i,j}$ and $p_{i+1,j}$ is three pixels, and $Sj=45$, $Si=13$, the number of dimensions of LEHF becomes 104. In this regard, the line segment feature detection unit 130 may perform weighting wi as illustrated in the expression (8) for each i. The line segment feature detection unit 130 performs the weighting illustrated in expression (8) so that it becomes possible to weight LEFH nearer to the line segment. A function G included in the expression (8) corresponds to a normal distribution having a variance $\sigma$, and the argument of G is the distance from the center.

$$wi=G((i-Si+\tfrac{1}{2})/3)) \quad (8)$$

Next, a description will be specifically given of the processing for the line-segment feature quantity calculation unit 123 to determine whether or not a line segment direction is a forward direction. Originally, it is possible to define a line segment as an aggregation that includes pixels having the brightness difference higher than a specific value on the both sides of the line segment. Accordingly, a line segment has a feature in that one of the sides of the line segment has a higher brightness than that of the other of the sides. Thus, when the line-segment feature quantity calculation unit 123 determines the direction of a line segment, the line-segment feature quantity calculation unit 123 makes a determination based on the intensity of the brightness of the both sides of the line segment.

When the direction of a line segment is expressed by an arrow, as viewed from a start point of an arrow to an end point, if the right side becomes bright, that direction is defined as the direction of the arrow. When defined in this manner, the direction of the line segment becomes the right direction from the left if the upside of the line segment is dark and the down side is bright. For example, when the line-segment feature quantity calculation unit 123 identifies the direction of a line segment, and if the direction of a line segment is from the left to the right direction, the direction of that line segment is assumed to be the forward direction. On the other hand, when the line-segment feature quantity calculation unit 123 identifies the direction of a line segment, if the direction is the left direction from the right, the direction of that line segment is assumed to be the backward direction.

In this regard, when the line-segment feature quantity calculation unit 123 determines the brightnesses of the both sides of the line segment, the line-segment feature quantity calculation unit 123 performs the following processing. The line-segment feature quantity calculation unit 123 obtains the brightnesses of the pixels at a predetermined specific distance from the line segment from each side and calculates the average value of the brightnesses of the pixels of each side. The line-segment feature quantity calculation unit 123 compares the average value of the brightnesses of one of the sides and the average value of the brightnesses of the other of the sides and determines the brightnesses of the both sides.

A description will be given of the calculation of a line-segment feature quantity using LEHF described above.

Figure 19:
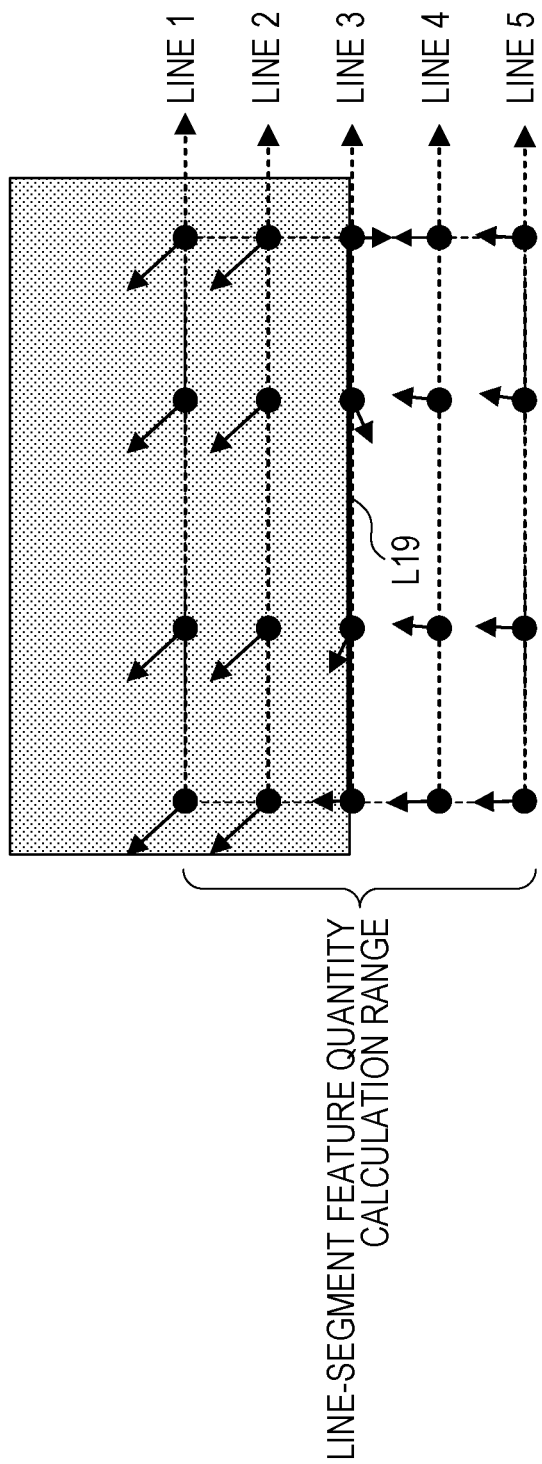
FIG. 19 is an explanatory diagram of calculation of a line-segment feature quantity using LEHF.

FIG. 19 is an explanatory diagram of calculation of a line-segment feature quantity using LEHF. In FIG. 19, a description will be given of the calculation of the line-segment feature quantity of an edge line L19.

The line-segment feature quantity calculation unit 123 takes 20 sample points evenly in the surroundings of the edge line L19. In FIG. 19, the sample points are denoted by black circles. The line-segment feature quantity calculation unit 123 obtains an eight-directional gradient histogram of each sample point. An arrow extending from a black circle denotes the gradient vector of a sample point.

Here, the line-segment feature quantity calculation unit 123 sets lines 1 to 5 which are parallel to the edge line L19. A line 3 is the same line as the edge line L19. A line 2 is a line produced by moving the line 3 a predetermined distance n in the vertical direction (up direction in FIG. 19) with respect to the edge line L19 so that the line 2 passes through four sample points in parallel with the edge line L19. A line 1 is a line produced by moving the line 3 a predetermined distance 2n in the vertical direction (up direction in FIG. 19) with respect to the edge line L19 so that the line 1 passes through four sample points in parallel with the edge line L19. A line 4 is a line produced by moving the line 3 a predetermined distance n in the vertical direction (down direction in FIG. 19) with respect to the edge line L19 so that the line 4 passes through four sample points in parallel with the edge line L19. A line 5 is a line produced by moving the line 3 a predetermined distance 2n in the vertical direction (down direction in FIG. 19) with respect to the edge line L19 so that the line 5 passes through four sample points in parallel with the edge line L19.

The line-segment feature quantity calculation unit 123 obtains the sum for each line of eight-direction gradient histograms of each sample point for each 45 degrees. Specifically, the line-segment feature quantity calculation unit 123 obtains the sum of eight-direction gradient histograms of four sample points in the line 1. In the same manner, the line-segment feature quantity calculation unit 123 obtains the sum of eight-direction gradient histograms of four sample points in the line 2, the sum of eight-direction gradient histograms of four sample points in the line 3, the sum of eight-direction gradient histograms of four sample points in the line 4, and the sum of eight-direction gradient histograms of four sample points in the line 5.

The sum for each line of the eight-direction gradient histograms of each sample point for each 45 degrees become as illustrated in FIG. 20. The line-segment feature quantity calculation unit 123 generates a vector in which the obtained sums are arranged in order and determines the vector as a line-segment feature quantity V.

The elements corresponding to the lines 1 to 5 in FIG. 20 correspond to $h_1$ to $h_5$ in the expression (6) respectively. Accordingly, the line-segment feature quantity V=LEHF= (0, 0, 8, 0, 0, 0, 0, 0, 0, 8, 0, 0, 0, 0, 0, 0, 2, 0, 4, 6, 0, 8, 0, 0, 4, 0, 0, 0, 0, 0, 0, 0, 4, 0, 0, 0, 0, 0, 0).

The line-segment feature quantity is calculated using the pixel values of the pixels on both sides of the edge line of an object. Accordingly, the line-segment feature quantity includes the pixel values of the pixels of the object surrounding the edge line and information of the pixel values of the pixels in the background.

Referring back to FIG. 16, a description will be continued.

In operation S303, the edge-line integration determination unit 124 groups edge lines for each edge line located in the same line. Specifically, the edge-line integration determination unit 124 groups the edge lines based on the following conditions (i) and (ii).

(i) The direction of the edge line is within the range of a predetermined threshold value (ii) The distance from a specific point in the image to the edge line is within the range of a predetermined threshold value The edge lines that satisfy the above-described conditions (i) and (ii) are disposed in the same line.

For example, in FIG. 6, the edge lines L21-1, L21-2, L21-3, L31-1, and L31-2 form one group. The edge lines L26-1 and L26-2 form one group. The edge lines L24, L25, L32, and L33 form individually different groups. Hereinafter a group of edge lines is referred to an edge line group.

In operation S304, the edge-line integration determination unit 124 selects a pair of two adjacent edge lines from the same edge line group. Here, unselected pair of two adjacent edge lines in a certain edge line group is selected. If all of the unselected pair of two adjacent edge lines in a certain edge line group have been selected, unselected pair of two adjacent edge lines in the other edge line group is selected.

In operation S305, the edge-line integration determination unit 124 calculates the distance between adjacent endpoints of the selected two edge lines (the first edge line and the second edge line). Specifically, the edge-line integration determination unit 124 calculates the distance between the second-edge-line side endpoint (that is to say, the endpoint that is nearer to the second edge line) out of the two endpoints of the first edge line and the first-edge-line side endpoint (that is to say, the endpoint that is nearer to the first edge line) out of the two endpoints of the second edge line out of the selected two edge lines.

In operation S306, the edge-line integration determination unit 124 determines whether or not the calculated distance between endpoints is larger than 0. That is to say, the edge-line integration determination unit 124 determines whether or not there is a gap between the endpoints. If the calculated distance between the endpoints is larger than 0, the control proceeds to operation S309, whereas if the calculated distance between the endpoints is 0, the control proceeds to operation S312.

In operation S309, the edge-line integration determination unit 124 compares the quantities of the individual line-segment features of the two selected edge lines. Specifically, the edge-line integration determination unit 124 calculates the similarity from the individual line-segment feature quantities of the two selected edge lines.

Here, a description will be given of calculation of a similarity. It is assumed that the individual line-segment feature quantities of the two edge lines are M1=($m1_1$, $m1_2$, ..., $m1_n$) and M2=($m2_1$, $m2_2$, ..., $m2_n$). The similarity d(M1, M2) is calculated by the similarity d(M1, M2)=$((m1_1-m2_1)^2+(m1_2-m2_2)^2+ \ldots +(m1_n-m2_n)^2)^{1/2}$.

In operation S310, the edge-line integration determination unit 124 determines whether or not the line-segment feature quantities of the two selected edge lines are similar. If the edge-line integration determination unit 124 determines that, for example, the similarity is lower than a threshold value, the edge-line integration determination unit 124 determines that they are similar, whereas if the similarity is higher than the threshold value, the edge-line integration determination unit 124 determines that they are not similar. If determined that they are similar, the control proceeds to operation S312, whereas if determined that they are not similar, the control proceeds to operation S311.

In operation S311, the edge-line integration determination unit 124 determines that the two selected edge lines are separate edge lines and not to integrate them.

In operation S312, the edge-line integration determination unit 124 determines to integrate the two selected edge lines. The edge-line integration determination unit 124 connects the two selected edge lines to generate an integrated edge line and records the information of the integrated edge line in the edge line information 143. In this regard, the line-segment feature quantity calculation unit 123 calculates the line-segment feature quantity of the integrated edge line.

In operation S313, if the processing for all the two adjacent edge lines in all the edge line groups including a plurality of edge lines has been completed (that is to say, if all the two adjacent edge lines in all the edge line groups including a plurality of edge lines have been selected), the first-edge-line detection and integration processing is terminated, whereas if the processing for all the two adjacent edge lines in all the edge line groups including a plurality of edge lines has not been completed, the control returns to operation S304.

By the first-edge-line detection and integration processing, whether or not to integrate two edge lines is determined based on the individual line-segment feature quantities of the two adjacent edge lines, and thus the precision of the integration and detection of lines is improved.

Figure 21:
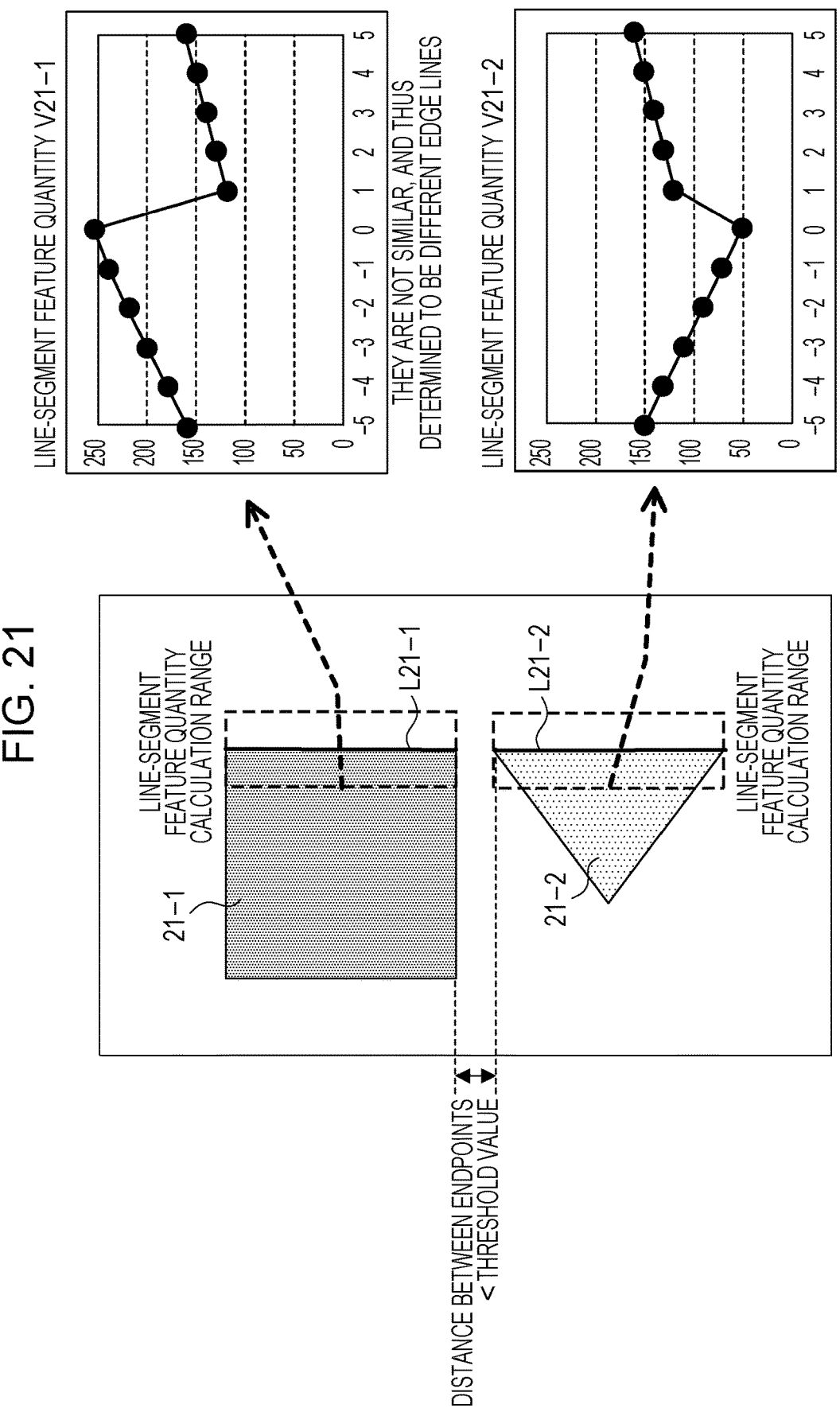
FIG. 21 is a diagram illustrating an example of first-edge-line detection and integration processing.

By the first-edge-line detection and integration processing, even if the distance between endpoints of two adjacent edge lines is small (less than or equal to a threshold value), the two edge lines are not integrated if the line-segment feature quantities are not similar. For example, as illustrated in FIG. 21, when the edge line L21-1 of the object 21-1 and the edge line L21-2 of the object 21-2 are detected, it is desirable that the edge line L21-1 and the edge line L21-2 be not integrated. In this regard, it is assumed that the color (pixel value) of the object 21-1 and the color (pixel value) of the object 21-2 are different.

When the distance between the endpoint of the edge line L21-1 and the endpoint of the edge line L21-2 is less than a threshold value, if the edge-line detection and integration processing according to the above-described comparative example is used, the edge line L21-1 and the edge line L21-2 are integrated. On the other hand, if the first-edge-line detection and integration processing according to the embodiment is used, the line-segment feature quantity V21-1 of the edge line L21-1 and the line-segment feature quantity V21-2 of the edge line L21-2 are not similar, and thus the edge line L21-1 and the edge line L21-2 are not integrated. In this manner, by the first-edge-line detection and integration processing, it is possible to avoid integration of the edge lines that indicate different edges.

Figure 22:
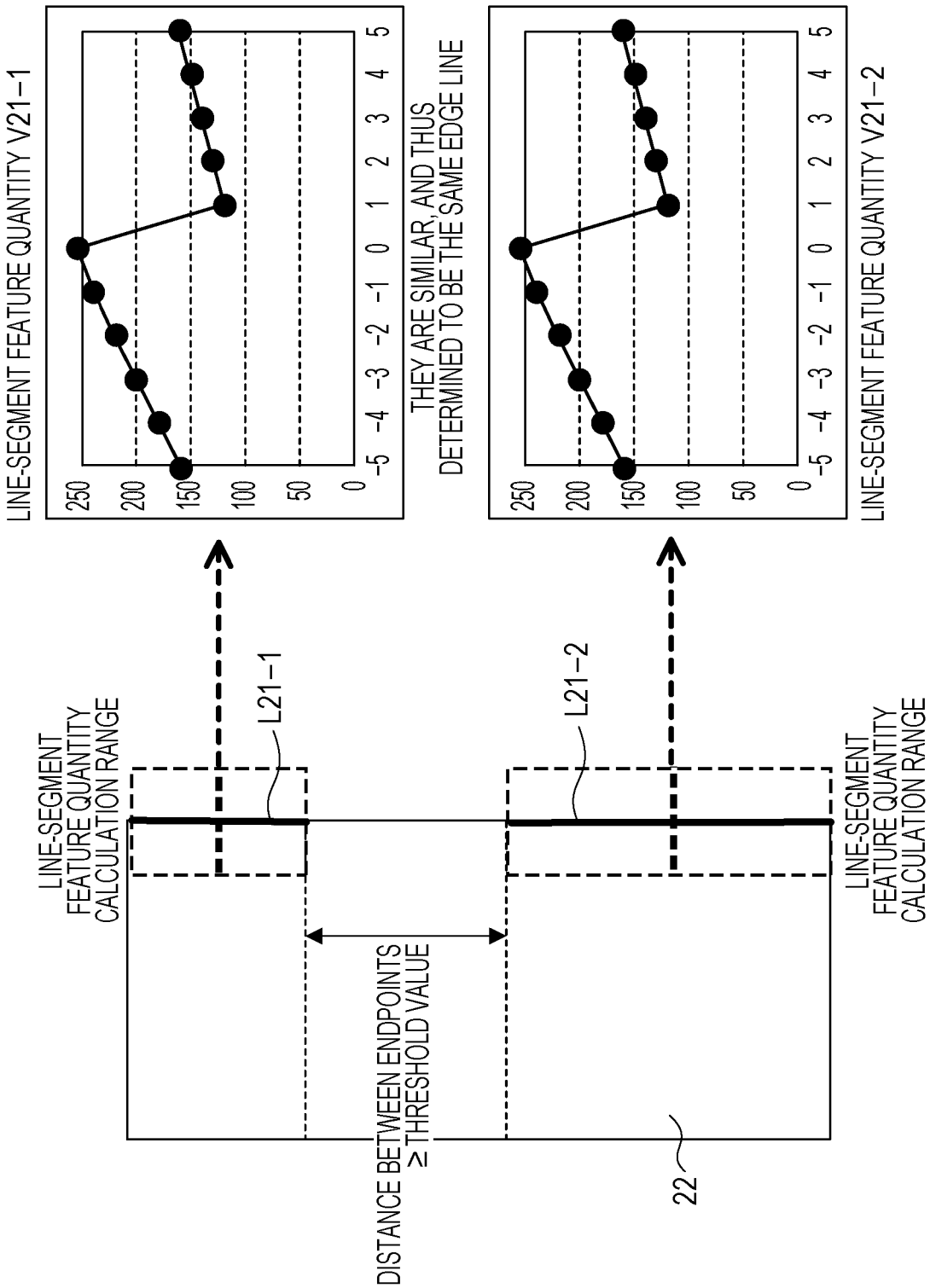
FIG. 22 is a diagram illustrating an example of the first-edge-line detection and integration processing.

By the first-edge-line detection and integration processing, even when the distance between endpoints of two adjacent edge lines is large (larger than a threshold value), if the line-segment feature quantities are similar, the two edge lines are integrated. For example, as illustrated in FIG. 22, if edge lines L21-1 and L21-2 are detected on the same edge of an object 22, it is desirable that the edge line L21-1 and the edge line L21-2 be integrated.

When the distance between an endpoint of the edge line L22-1 and an endpoint of the edge line L22-2 is equal to or larger than a threshold value, if the edge-line detection and integration processing according to the above-described comparative example is used, the edge line L21-1 and the edge line L21-2 are not integrated. On the other hand, if the first-edge-line detection and integration processing according to the embodiment is used, the line-segment feature quantity V22-1 of the edge line L22-1 and the line-segment feature quantity V22-2 of the edge line L22-2 are similar, and thus the edge line L22-1 and the edge line L22-2 are integrated. In this manner, by the first-edge-line detection and integration processing, it is possible to integrate edge lines that are located apart on the same edge.

In this regard, in the above description, whether or not to integrate two edge lines is determined based on the individual line-segment feature quantities of the two edge lines. However, as described below, a plurality of edge lines in edge line group may be determined all at once using cluster classification.

Figure 23:
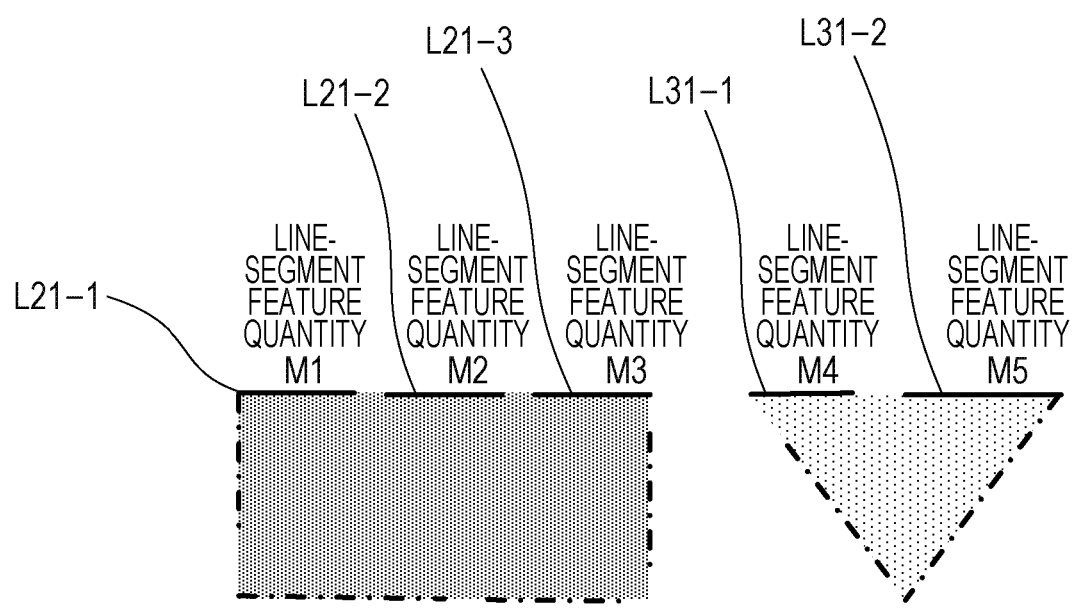
FIG. 23 is an explanatory diagram of an example of collectively determining the integration of a plurality of edge lines.

A description will be given of the case where a determination is made of the edge lines L21-1, L21-2, L21-3, L31-1, and L31-2 included in the same edge line group illustrated in FIG. 23. It is assumed that the respective line-segment feature quantities of the edge lines L21-1, L21-2, L21-3, L31-1, and L31-2 are M1 to M5.

The edge-line integration determination unit 124 calculates the respective similarities $d(M1, M1)$, $d(M1, M2)$, $d(M1, M3)$, $d(M1, M4)$, $d(M1, M5)$ of the edge line L21-1 and the edge line L21-1, the edge line L21-1 and the edge line L21-2, the edge line L21-1 and the edge line L21-3, the edge line L21-1 and the edge line L31-1, and the edge line L21-1 and the edge line 31-2. Also, the edge-line integration determination unit 124 calculates the average value Av of the line-segment feature quantities M1 to M5 and the standard deviation $\sigma$.

When a plurality of edge lines in an edge line group is determined all at once, if the standard deviation $\sigma$ of the line-segment feature quantities of a plurality of edge lines is lower than or equal to a threshold value, the line-segment feature quantities of the plurality of edge lines are similar, and thus the plurality of edge lines are determined to be integrated. If the standard deviation $\sigma$ of the line-segment feature quantities of a plurality of edge lines is higher than the threshold value, among the individual similarities between the line-segment feature quantity of a certain edge line and the line-segment feature quantities of a plurality of edge lines, the edge lines corresponding to the line-segment feature quantities used in the calculation of similarities lower than the average value Av are determined to be integrated.

Figure 24:
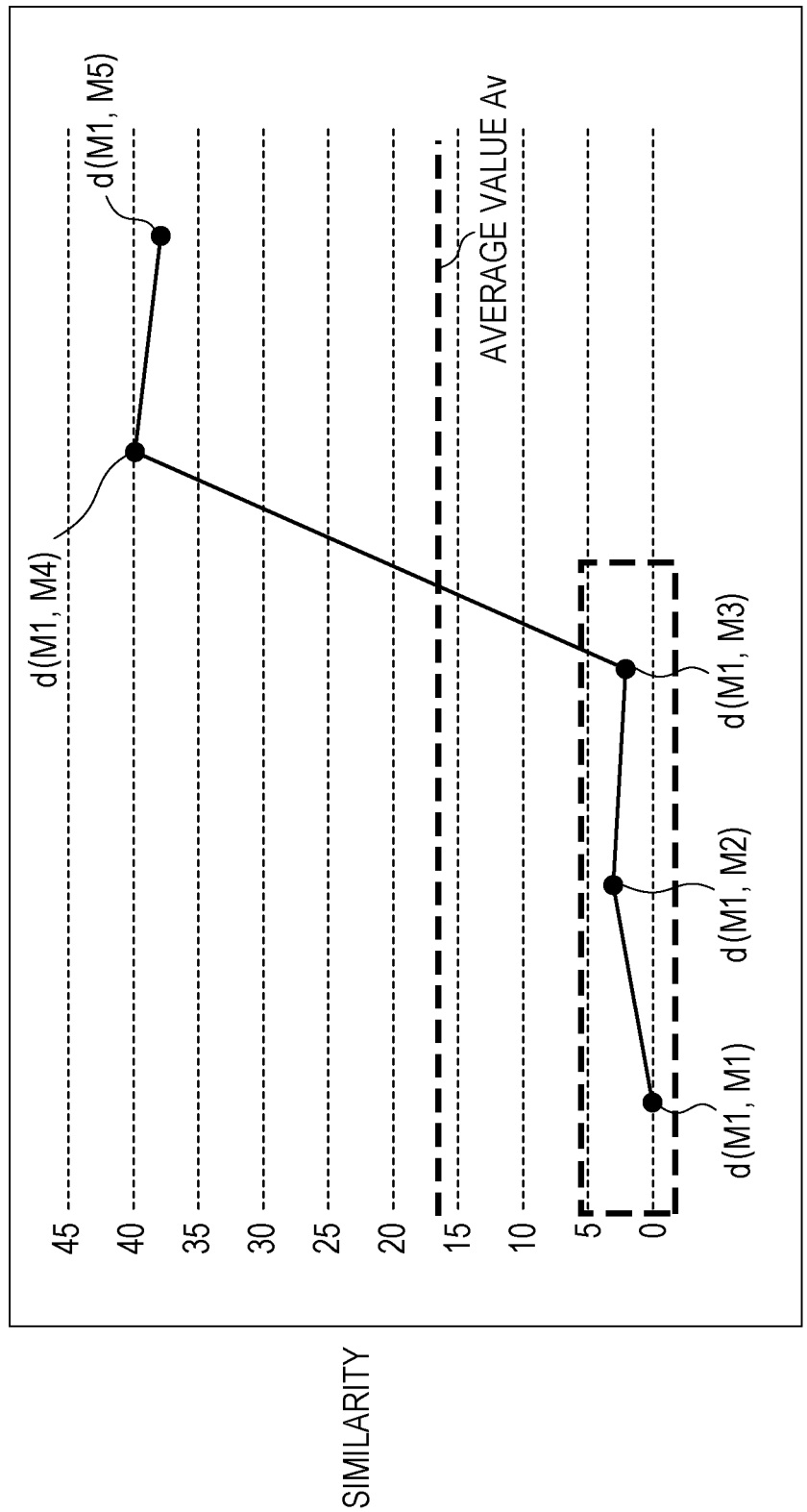
FIG. 24 is a diagram illustrating an example of determination based on a line-segment feature quantity M1.

FIG. 24 is a diagram illustrating an example of determination based on a line-segment feature quantity M1. The calculated similarity is plotted on a graph as illustrated in FIG. 24.

In FIG. 24, it is assumed that the standard deviation $\sigma$ of the line-segment feature quantities M1 to M5 is higher than a threshold value. As illustrated in FIG. 24, the similarities $d(M1, M1)$, $d(M1, M2)$, and $d(M1, M3)$ are lower than the average value Av, and the similarities $d(M1, M4)$ and $d(M1, M5)$ are higher than the average value Av. Accordingly, the edge lines L21-1, L21-2, and L21-3 are determined to be integrated.

Second-Edge-Line Detection and Integration Processing

Figure 25:
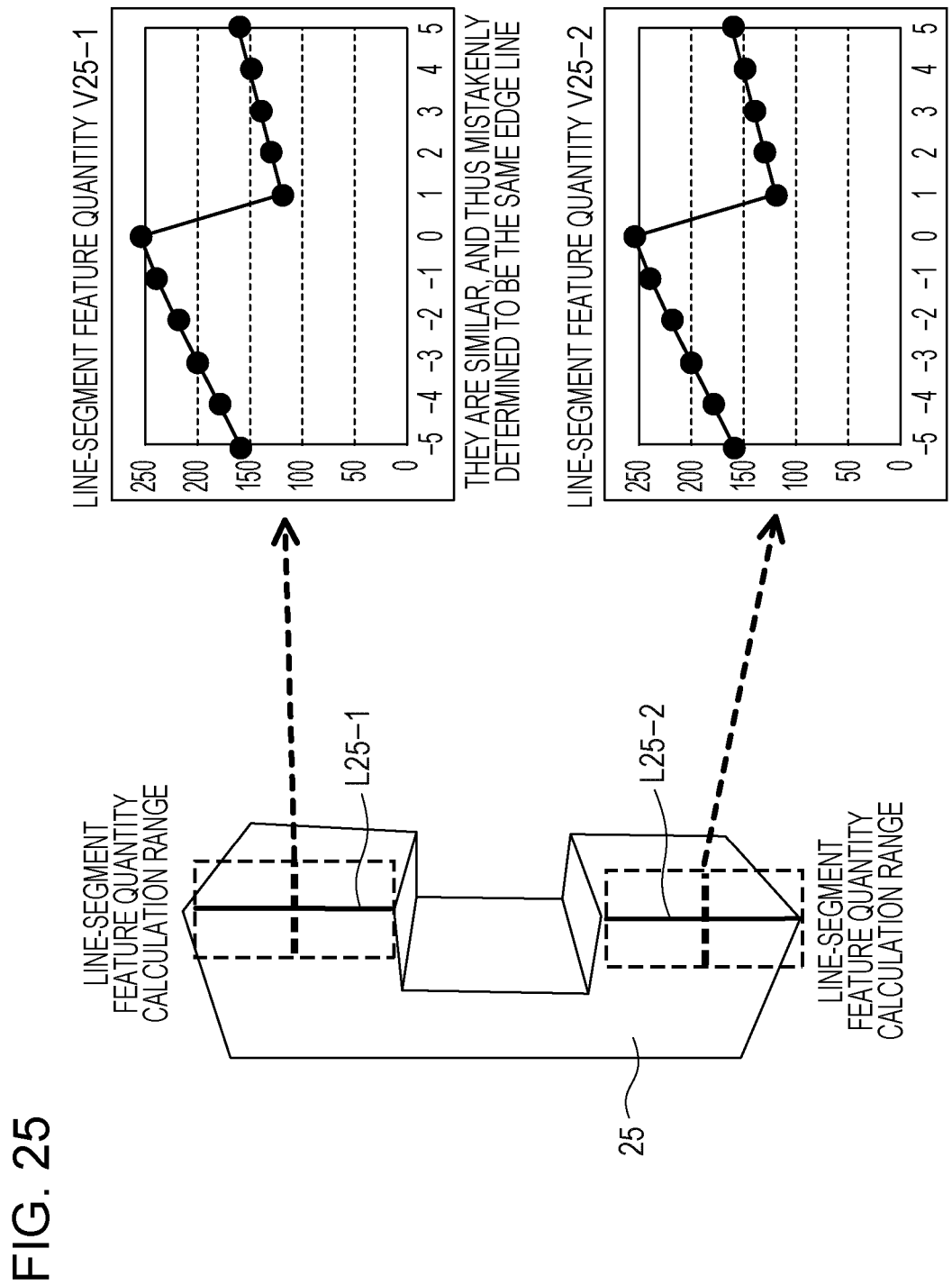
FIG. 25 is a diagram illustrating an example of the first-edge-line detection and integration processing.

As illustrated in FIG. 25, it is assumed that there is a concave object 25 that is vertically symmetric, and the edge lines L25-1 and L25-2 of the object 25 are detected. In the object 25, there is a space between an edge denoted by an edge line L25-1 and an edge denoted by an edge line L25-2, and thus it is desirable that the edge line L25-1 and the edge line L25-2 be not integrated. However, the edge line L25-1 and the edge line L25-2 are symmetric parts of the edge line of the object 25 that is vertically symmetric, and thus the line-segment feature quantity V25-1 of the edge line L25-1 and the line-segment feature quantity V25-2 of the edge line L25-2 are similar. Accordingly, there is a problem in that if the above-described first-edge-line detection and integration processing is used, the edge line L25-1 and the edge line L25-2 are to be integrated.

Figure 26:
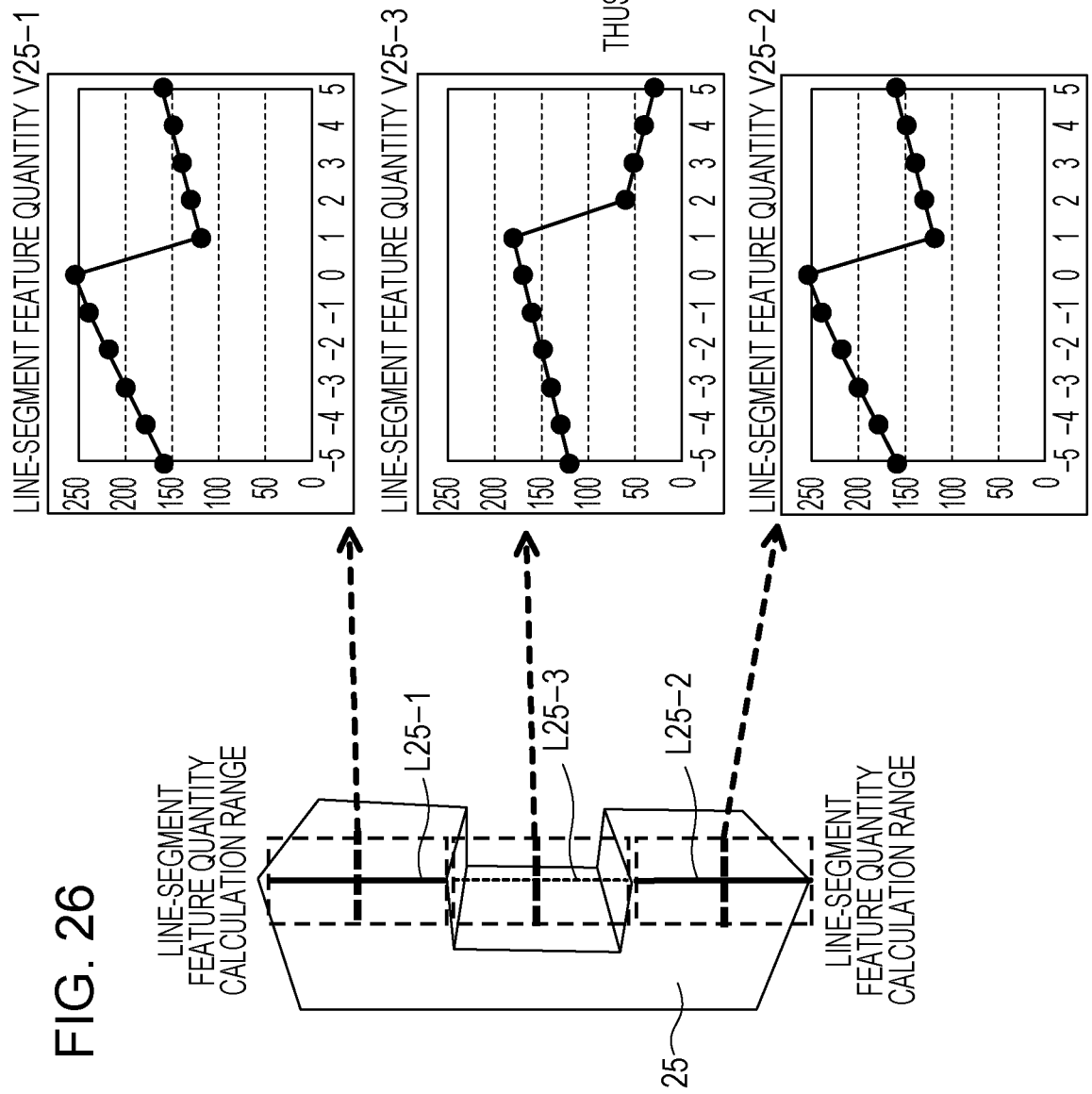
FIG. 26 is a diagram illustrating an example of second-edge-line detection and integration processing.

In the second-edge-line detection and integration processing, such a problem is to be solved. As illustrated in FIG. 26, the line-segment feature quantity calculation unit 123 sets a virtual edge line L25-3 that connects the edge line L25-1 and the edge line L25-2 between the edge line L25-1 and the edge line L25-2 and calculates the line-segment feature quantity V25-3 of the virtual edge line L25-3. For example, in FIG. 26, the line-segment feature quantity calculation range of the virtual edge line L25-3, which is illustrated by a dotted-line rectangle, includes a larger amount of background of the object 25 compared with the respective line-segment feature quantity calculation ranges of the edge lines L25-1 and L25-2. Accordingly, the line-segment feature quantity V25-3 is not similar to the line-segment feature quantity V25-1. Also, the line-segment feature quantity V25-3 is not similar to the line-segment feature quantity V25-2.

In the second-edge-line detection and integration processing, a determination is made whether to integrate with an edge line based on the similarity between the line-segment feature quantity of the edge line and the line-segment feature quantity of the virtual edge line. As described above, the line-segment feature quantity V25-3 is not similar to the line-segment feature quantity V25-1. Also, the line-segment feature quantity V25-3 is not similar to the line-segment feature quantity V25-2. Accordingly, the edge line L25-1 and the edge line L25-2 are determined to be separate edge lines, and thus the edge line L25-1 and the edge line L25-2 are not to be integrated.

Figure 27:
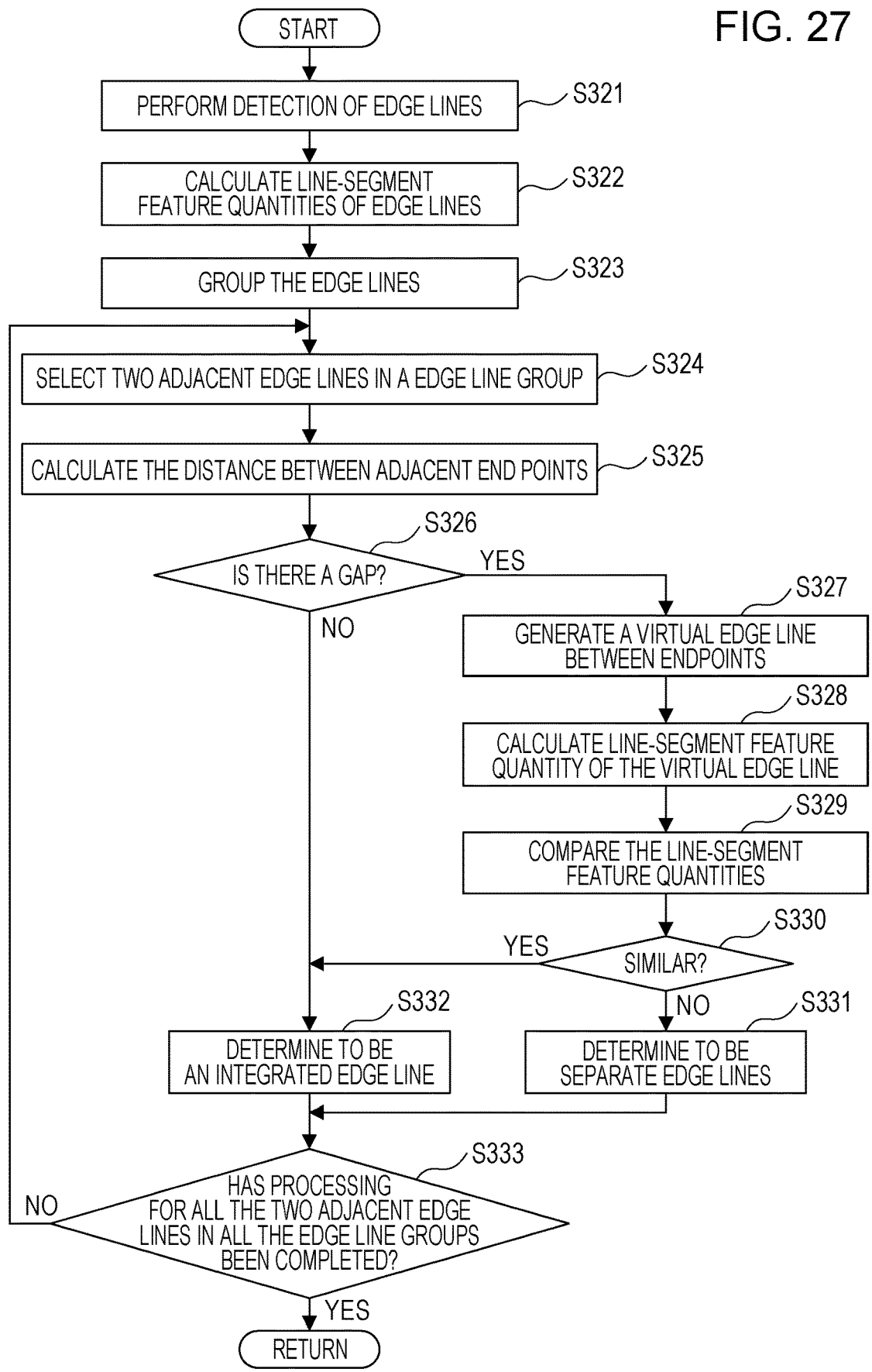
FIG. 27 is a detail flowchart of the second-edge-line detection and integration processing.

FIG. 27 is a detail flowchart of the second-edge-line detection and integration processing. The processing in FIG. 27 corresponds to the operation S202 in FIG. 15.

Each processing of the operations S321 to S325 in FIG. 27 is the same as each processing of the operations S301 to S305 in FIG. 16, and thus the description thereof will be omitted.

In operation S326, the edge-line integration determination unit 124 determines whether or not the calculated distance between the endpoints is larger than 0. That is to say, the edge-line integration determination unit 124 determines whether or not there is a gap between the endpoints. If the calculated distance between the endpoints is larger than 0, the control proceeds to operation S327, whereas if the calculated distance between endpoints is 0, the control proceeds to operation S332.

In operation S327, the edge-line integration determination unit 124 generates a virtual edge line that connects a second-edge-line side endpoint of the first edge line (that is to say, an endpoint nearer to the second edge line) out of the two endpoints of the first edge line out of the two selected edge lines and a first-edge-line side endpoint of the second edge line (that is to say, an endpoint nearer to the first edge line) out of the two endpoints of the second edge line out of the two selected edge lines. For example, in FIG. 26, the edge-line integration determination unit 124 generates the virtual edge line L25-3 that connects the edge line L25-1 and the edge line L25-2.

In operation S328, the line-segment feature quantity calculation 123 calculates the line-segment feature quantity of the virtual edge line. The method of calculating the line-segment feature quantity of the virtual edge line is the same as that of the line-segment feature quantity of an edge line. For example, in FIG. 26, the line-segment feature quantity calculation 123 calculates the line-segment feature quantity V25-3 of the virtual edge line L25-3.

In operation S329, the edge-line integration determination unit 124 compares the line-segment feature quantity of the first edge line out of the two selected edge lines with the line-segment feature quantity of the virtual edge line. The edge-line integration determination unit 124 compares the line-segment feature quantity of the second edge line out of the two selected edge lines with the line-segment feature quantity of the virtual edge line. Specifically, the edge-line integration determination unit 124 calculates the first similarity from the line-segment feature quantity of the first edge line out of the two selected edge lines and the line-segment feature quantity of the virtual edge line. The edge-line integration determination unit 124 calculates the second similarity from the line-segment feature quantity of the second edge line out of the two selected edge lines and the line-segment feature quantity of the virtual edge line.

In operation S330, the edge-line integration determination unit 124 determines whether or not the line-segment feature quantity of the first edge line and the line-segment feature quantity of the virtual edge line are similar based on the calculated first similarity. The edge-line integration determination unit 124 determines whether or not the line-segment feature quantity of the second edge line and the line-segment feature quantity of the virtual edge line are similar based on the calculated second similarity.

For example, if the first similarity is lower than a threshold value, the edge-line integration determination unit 124 determines that the line-segment feature quantity of the first edge line and the line-segment feature quantity of the virtual edge line are similar, whereas if the first similarity is equal to or higher than the threshold value, the edge-line integration determination unit 124 determines that the line-segment feature quantity of the first edge line and the line-segment feature quantity of the virtual edge line are not similar. For example, if the second similarity is lower than a threshold value, the edge-line integration determination unit 124 determines that the line-segment feature quantity of the second edge line and the line-segment feature quantity of the virtual edge line are similar, whereas if the second similarity is equal to or higher than the threshold value, the edge-line integration determination unit 124 determines that the line-segment feature quantity of the second edge line and the line-segment feature quantity of the virtual edge line are not similar.

If determined that the line-segment feature quantity of the first edge line and the line-segment feature quantity of the virtual edge line are similar, and the line-segment feature quantity of the second edge line and the line-segment feature quantity of the virtual edge line are similar, the control proceeds to operation S332. If determined that the line-segment feature quantity of the first edge line and the line-segment feature quantity of the virtual edge line are not similar, or the line-segment feature quantity of the second edge line and the line-segment feature quantity of the virtual edge line are not similar, the control proceeds to operation S331.

Each processing of the operations S331 to S333 in FIG. 27 is the same as each processing of the operations S311 to S313 in FIG. 16, and thus the description thereof will be omitted.

For example, in FIG. 26, the line-segment feature quantity V25-1 of the edge line L25-1 and the line-segment feature quantity V25-3 of the virtual edge line L25-3 are not similar. Also, the line-segment feature quantity V25-2 of the edge line L25-2 and the line-segment feature quantity V25-3 of the virtual edge line L25-3 are not similar. Accordingly, the edge line L25-1 and the edge line L25-2 are determined to be separate edge lines, and thus the edge line L25-1 and the edge line L25-2 are not integrated.

By the second-edge-line detection and integration processing, it is possible to avoid the integration of two edge lines that indicate two different edges in spite of the fact that the line-segment feature quantities of the two edge lines are similar, and thus the precision of detecting integrated edge line is improved.

Third-Edge-Line Detection and Integration Processing

Figure 28:
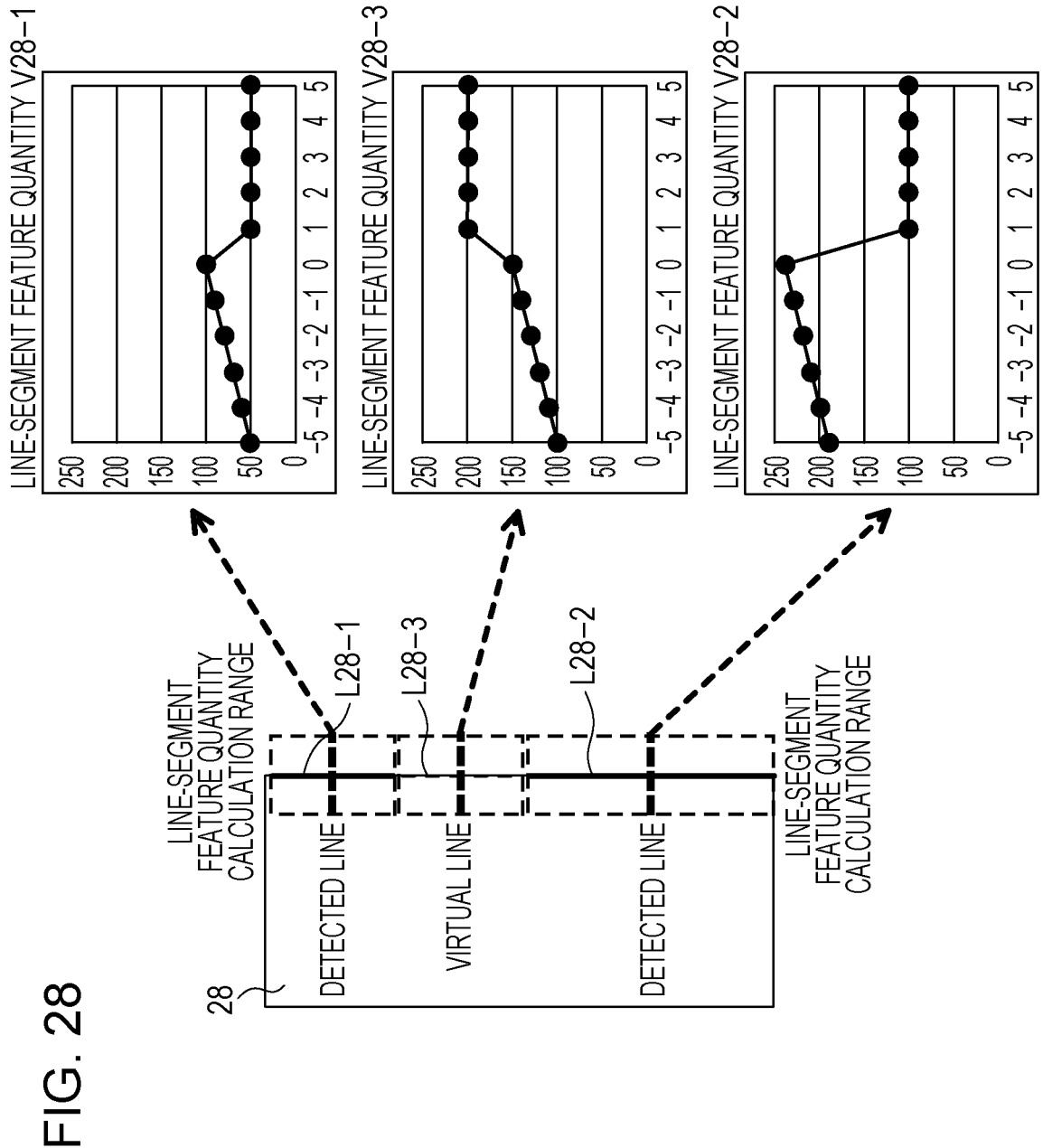
FIG. 28 is a diagram illustrating an example of the second-edge-line detection and integration processing.

As illustrated in FIG. 28, it is assumed that there is an object 28, and edge lines L28-1 and L28-2 are detected on a certain edge of the object 28. In the object 28, the edge line L28-1 and the edge line L28-2 are on the same edge, and thus it is desirable that the edge line L28-1 and the edge line L28-2 be integrated. Here, it is assumed that the background of the object 28 in the surroundings of the edge lines L28-1 and the L28-2 is dark (the pixel value is low), and the background of the object 28 in the surroundings between the edge line L28-1 and the edge line L28-2 is bright (the pixel value is high). In this regard, it is assumed that the brightness (pixel value) of the background is changing gradually from the surroundings of the edge line L28-1 to the surroundings between the edge line L28-1 and the edge line L28-2. The brightness (pixel value) of the background is assumed to be changing gradually from the surroundings of the edge line L28-2 to the surroundings between the edge line L28-1 and the edge line L28-2.

In FIG. 28, a determination is made as to whether or not the edge line L28-1 and the edge line L28-2 are to be integrated using the above-described second-edge-line detection and integration processing. The line-segment feature quantity calculation unit 123 generates a virtual edge line L28-3 between the edge line L28-1 and the edge line L28-2 and calculates the line-segment feature quantity V28-3 of the virtual edge line L28-3.

As described above, in FIG. 28, the background of the object 28 is dark in the surroundings of the edge lines L28-1 and L28-2, and is bright in the surroundings between the edge line L28-1 and the edge line L28-2 (that is to say, the surroundings of the virtual edge line L28-3). Accordingly, the line-segment feature quantity V28-1 of the edge line L28-1 and the line-segment feature quantity V28-3 of the virtual edge line L28-3 are not similar. Also, the line-segment feature quantity V28-2 of the edge line L28-2 and the line-segment feature quantity V28-3 of the virtual edge line L28-3 are not similar.

As a result, there is a problem in that if the above-described second-edge-line detection and integration processing is used, the edge line L28-1 and the edge line L28-2 are not integrated.

Figure 29:
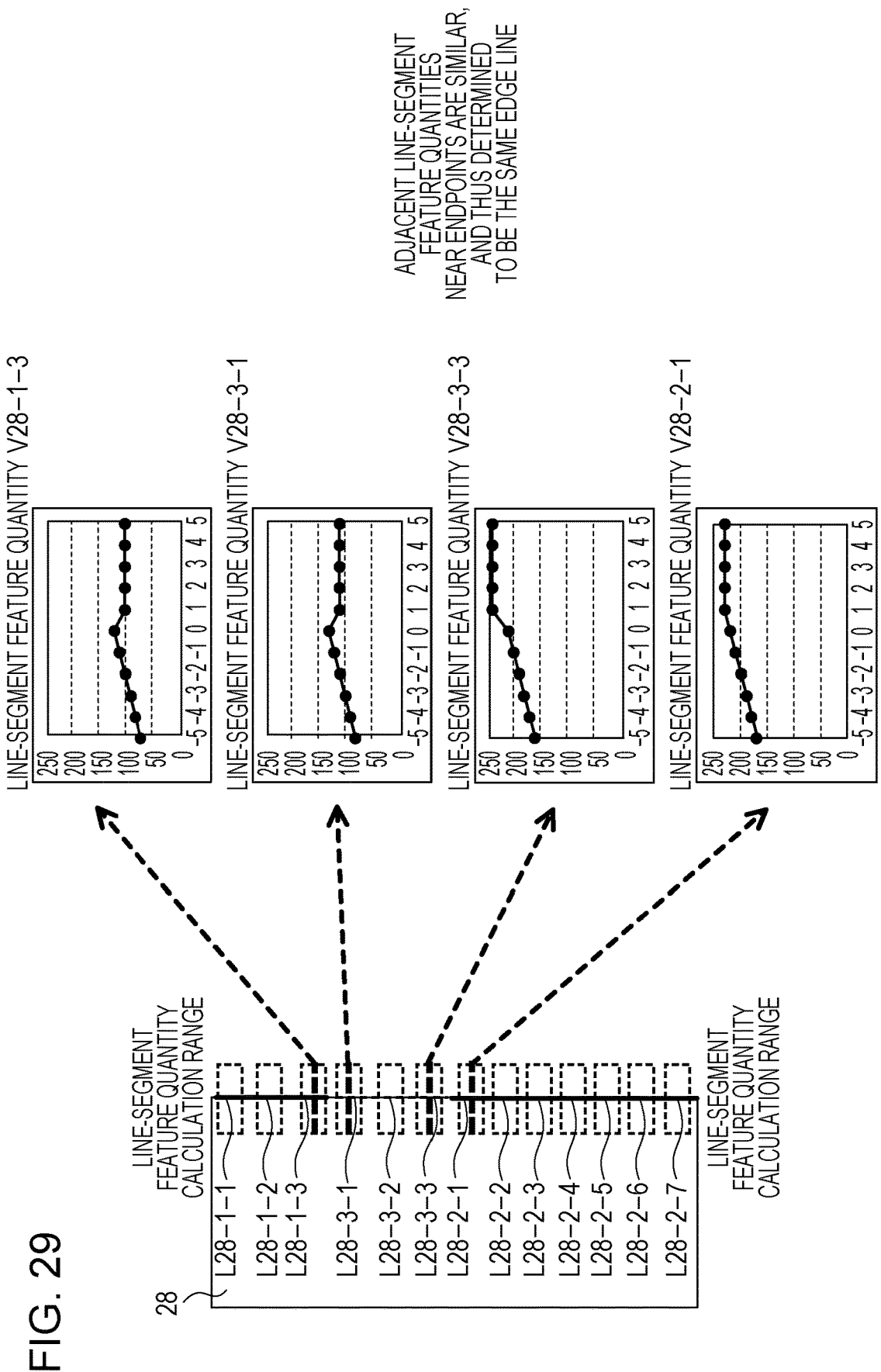
FIG. 29 is a diagram illustrating an example of third-edge-line detection and integration processing.

The third-edge-line detection and integration processing solves such a problem. The line-segment feature quantity calculation unit 123 divides the edge line L28-1 by a predetermined length and generates sub-edge lines L28-1-1 to 28-1-3 as illustrated in FIG. 29. The line-segment feature quantity calculation unit 123 divides the edge line L28-2 by a predetermined length and generates sub-edge lines L28-2-1 to 28-2-7 as illustrated in FIG. 29. The line-segment feature quantity calculation unit 123 divides the virtual edge line L28-3 by a predetermined length and generates sub-edge lined L28-3-1 to 28-3-3 as illustrated in FIG. 29.

The line-segment feature quantity calculation unit 123 calculates the line-segment feature quantities of the sub-edge lines L28-1-1 to L28-1-3, L28-2-1 to L28-2-7, and L28-3-1 to L28-3-3.

The edge-line integration determination unit 124 determines whether or not the line-segment feature quantity V28-1-3 of the sub-edge line L28-1-3 including an endpoint connected to the virtual edge line L28-3 is similar to the line-segment feature quantity V28-3-1 of the sub-edge line L28-3-1 including an endpoint connected to the edge line 28-1. The brightness of the surroundings of the sub-edge line L28-1-3 and the brightness of the background of the surroundings of the sub-edge line L28-3-1 are substantially the same.

Accordingly, the line-segment feature quantity V28-1-3 of the sub-edge line L28-1-3 and the line-segment feature quantity V28-3-1 of the sub-edge line L28-3-1 are similar, and thus it is determined that the sub-edge line L28-1-3 and the sub-edge line L28-3-1 are integrated.

The edge-line integration determination unit 124 determines whether or not the line-segment feature quantity V28-2-1 of the sub-edge line L28-2-1 including an endpoint connected to the virtual edge line L28-3 is similar to the line-segment feature quantity V28-3-3 of the sub-edge line L28-3-3 including an endpoint connected to the edge line 28-2. The brightness of the surroundings of the sub-edge line L28-2-1 and the brightness of the background of the surroundings of the sub-edge line L28-3-3 are substantially the same.

Accordingly, the line-segment feature quantity V28-2-1 of the sub-edge line L28-2-1 and the line-segment feature quantity V28-3-3 of the sub-edge line L28-3-3 are similar, and thus it is determined that the sub-edge line L28-2-1 and the sub-edge line L28-3-3 are integrated.

Also, out of the sub-edge lines L28-1-1 to L28-1-3, adjacent sub-edge lines are connected with each other, and thus the sub-edge lines L28-1-1 to L28-1-3 are determined to be integrated. Also, out of sub-edge lines L28-2-1 to L28-1-7, adjacent sub-edge lines are connected with each other, and thus the sub-edge lines L28-2-1 to L28-2-7 are determined to be integrated. Out of the sub-edge lines L28-3-1 to L28-3-3, adjacent sub-edge lines are connected with each other, and thus the sub-edge lines L28-2-1 to L28-2-3 are determined to be integrated.

Finally, the sub-edge lines L28-1-1 to L28-1-3, L28-2-1 to L28-2-7, and L28-3-1 to L28-3-3 are determined to be integrated. That is to say, the edge line L28-1 and the edge line L28-2 are integrated.

As described above, it is assumed that the background of the object 28 is dark in the surroundings of the edge lines L28-1 and L28-2 and is bright in the surroundings between the edge line L28-1 and the edge line L28-2. In this regard, the brightness of the background (pixel value) becomes gradually higher from the surroundings of the sub-edge line L28-1-1 to the sub-edge line L28-3-2 and becomes gradually higher from the surroundings of the sub-edge line L28-2-7 to the sub-edge line L28-3-2.

Compared with a sub-edge line, the edge lines L28-1 and L28-2 and the virtual edge line 28-3 are long, and thus the line-segment feature quantity calculation range becomes wide. Thus the line-segment feature quantity V28-1 of the edge line L28-1, the line-segment feature quantity V28-1 of the edge line L28-2, and the line-segment feature quantity V28-3 of the virtual edge line 28-3 receive a larger impact of a change in the brightness of the background. Accordingly, by the second-edge-line detection and integration processing, the line-segment feature quantity V28-1 and the line-segment feature quantity V28-3 are determined not to be similar. Also, the line-segment feature quantity V28-2 and the line-segment feature quantity V28-3 are determined not to be similar, and thus the edge line L28-1 and the edge line L28-2 are not integrated.

A sub-edge line is short compared with an edge line and a virtual edge line, and thus the line-segment feature quantity calculation range becomes small, and the line-segment feature quantity of the sub-edge line receives a smaller impact of a change in the brightness of the background. Accordingly, the line-segment feature quantity V28-1-3 of the sub-edge line L28-1-3 and the line-segment feature quantity V28-3-1 of the sub-edge line L28-3-1 have similar values, and thus the line-segment feature quantity V28-1-3 and the line-segment feature quantity V28-3-1 are determined to be similar.

Figure 30:
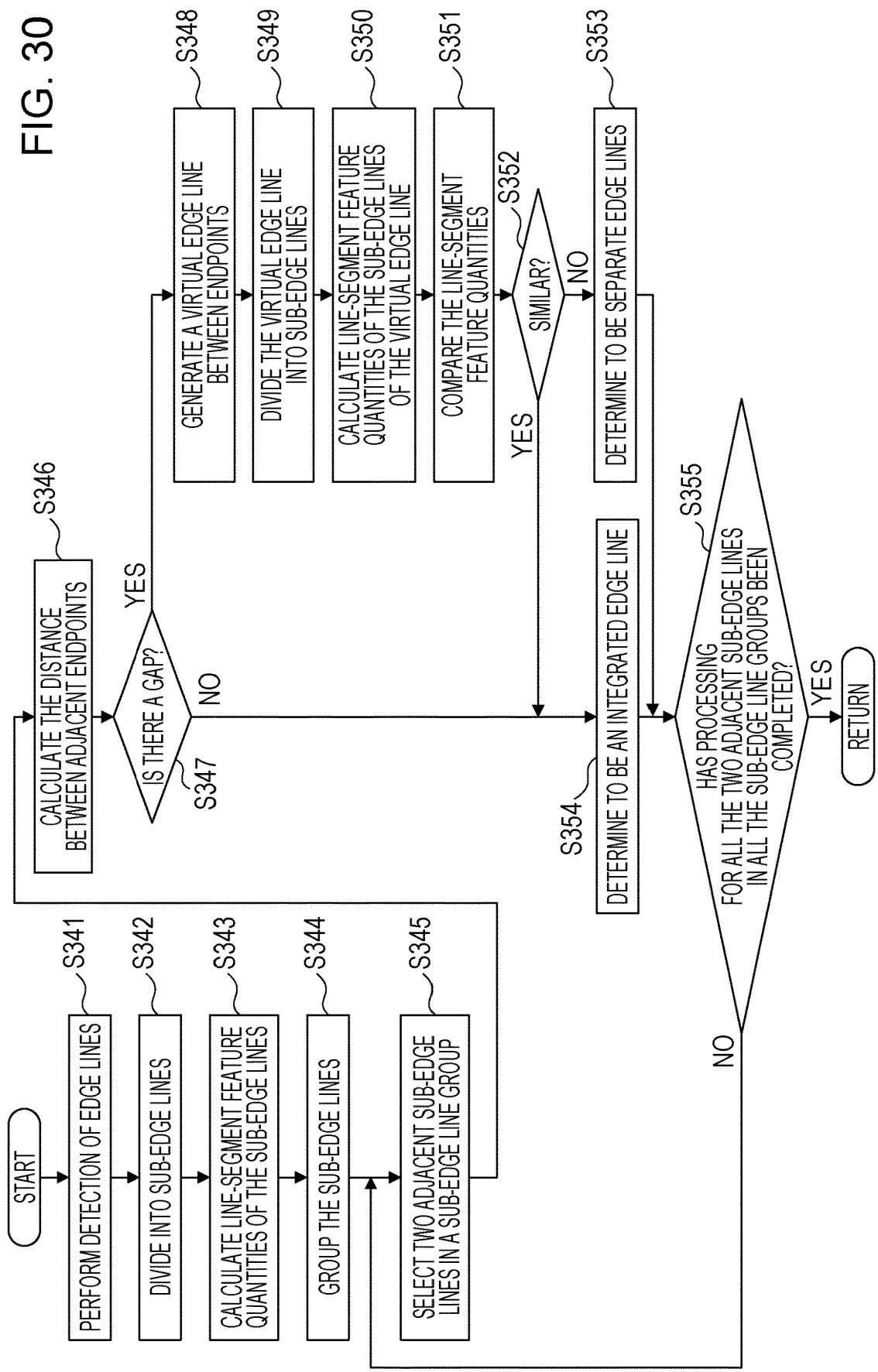
FIG. 30 is a detail flowchart of the third-edge-line detection and integration processing.

FIG. 30 is a detail flowchart of the third-edge-line detection and integration processing. The processing in FIG. 30 corresponds to the processing of operation S202 in FIG. 15.

In operation S341, the edge-line detection unit 122 detects edge lines from the captured image. Specifically, the edge-line detection unit 122 extracts a part having a shading change (change of pixel value) higher than a predetermined threshold value in the captured image as a candidate. The edge-line detection unit 122 integrates candidates that are adjacent and have similar shading change directions to detect as a line segment (edge line). That is to say, the same processing as that of the edge-line detection and integration processing of the operations 1 and 2 according to the comparative example is performed.

In operation S342, the edge-line detection unit 122 divides the edge line for each a predetermined length to generate sub-edge lines.

In operation S343, the line-segment feature quantity calculation unit 123 calculates the line-segment feature quantities of the sub-edge lines.

In operation S344, the edge-line integration determination unit 124 groups the sub-edge lines for each of the sub-edge lines located in the same line. Specifically, the edge-line integration determination unit 124 groups the sub-edge lines based on the following conditions (i) and (ii).

(i) The direction of the sub-edge line is within the range of a predetermined threshold value (ii) The distance from a specific point in the image to the sub-edge line is within the range of a predetermined threshold value The sub-edge lines that satisfy the above-described conditions (i) and (ii) are disposed on the same line. Hereinafter a group of sub-edge lines is referred to as a sub-edge line group.

In operation S345, the edge-line integration determination unit 124 selects a pair of two sub-edge lines adjacent with each other from the same sub-edge line group. Here, a pair of two unselected adjacent sub-edge lines in a certain sub-edge line group is selected. If all the pair of two unselected adjacent sub-edge lines in a certain sub-edge line group have been selected, a pair of two unselected adjacent sub-edge lines in the other sub-edge line group is selected.

In operation S346, the edge-line integration determination unit 124 calculates the distance between adjacent endpoints of the selected two sub-edge lines (the first sub-edge line and the second sub-edge line). Specifically, the edge-line integration determination unit 124 calculates the distance between the second sub-edge-line side endpoint (that is to say, the endpoint nearer to the second sub-edge line) out of the two endpoints of the first sub-edge line and the first sub-edge-line side endpoint (that is to say, the endpoint nearer to the first sub-edge line) out of the selected two sub-edge lines.

In operation S347, the edge-line integration determination unit 124 determines whether or not the calculated distance between the endpoints is larger than 0. That is to say, the edge-line integration determination unit 124 determines whether or not there is a gap between the endpoints. If the calculated distance between the endpoints is larger than 0, the control proceeds to operation S348, whereas of the calculated distance between the endpoints is 0, the control proceeds to operation S354.

In operation S348, the edge-line integration determination unit 124 generates a virtual edge line that connects the second sub-edge-line side endpoint (that is to say, the endpoint nearer to the second sub-edge line) out of the two endpoints of the first sub-edge line out of the selected two sub-edge lines and the first-sub-edge line side endpoint (that is to say, the endpoint nearer to the first sub-edge line) out of the two endpoints of the second sub-edge line out of the two selected edge lines. For example, in FIG. 28, the edge-line integration determination unit 124 generates the virtual edge line L28-3 that connects the edge line L28-1 and the edge line L28-2.

In operation S349, the edge-line integration determination unit 124 divides the virtual edge line by a predetermined length to generate sub-edge lines (virtual sub-edge lines) of the virtual edge line. For example, the edge-line integration determination unit 124 divides the virtual edge line L28-3 to generate sub-edge lines L28-3-1 to L28-3-3.

In operation S350, the line-segment feature quantity calculation unit 123 calculates the line-segment feature quantities of the sub-edge lines produced by dividing the virtual edge line.

In operation S351, the edge-line integration determination unit 124 compares the line-segment feature quantity of the first sub-edge line and the line-segment feature quantity of the first virtual sub-edge line adjacent to the first sub-edge line. The edge-line integration determination unit 124 compares the line-segment feature quantity of the second sub-edge line and the line-segment feature quantity of the second virtual sub-edge line adjacent to the second sub-edge line.

Specifically, the edge-line integration determination unit 124 calculates a first similarity from the line-segment feature quantity of the first sub-edge line and the line-segment feature quantity of the virtual sub-edge line adjacent to the first sub-edge line. The edge-line integration determination unit 124 calculates a second similarity from the line-segment feature quantity of the second sub-edge line and the line-segment feature quantity of the virtual sub-edge line adjacent to the second sub-edge line.

For example, in FIG. 29, the edge-line integration determination unit 124 calculates a first similarity from the line-segment feature quantity V28-1-3 of the sub-edge line L28-1-3 and the line-segment feature quantity V28-3-1 of the virtual sub-edge line L28-3-1 adjacent to the sub-edge line L28-1-3. Also, the edge-line integration determination unit 124 calculates a second similarity from the line-segment feature quantity V28-2-1 of the sub-edge line L28-2-1 and the line-segment feature quantity V28-3-3 of the virtual sub-edge line L28-3-3 adjacent to the sub-edge line L28-2-1.

In operation S352, the edge-line integration determination unit 124 determines the line-segment feature quantity of the first sub-edge line and the line-segment feature quantity of the first virtual sub-edge line based on the calculated first similarity. The edge-line integration determination unit 124 determines whether or not the line-segment feature quantity of the second sub-edge line and the line-segment feature quantity of the second virtual sub-edge line are similar based on the calculated second similarity. For example, if the first similarity is lower than a threshold value, the edge-line integration determination unit 124 determines that the line-segment feature quantity of the first sub-edge line and the line-segment feature quantity of the first virtual sub-edge line are similar, whereas if the first similarity is equal to or higher than the threshold value, the edge-line integration determination unit 124 determines that the line-segment feature quantity of the first sub-edge line and the line-segment feature quantity of the first virtual sub-edge line are not similar. For example, if the second similarity is lower than a threshold value, the edge-line integration determination unit 124 determines that the line-segment feature quantity of the second sub-edge line and the line-segment feature quantity of the second virtual sub-edge line are similar, whereas if the second similarity is equal to or higher than the threshold value, the edge-line integration determination unit 124 determines that the line-segment feature quantity of the second sub-edge line and the line-segment feature quantity of the second virtual sub-edge line are not similar.

If determined that the line-segment feature quantity of the first sub-edge line and the line-segment feature quantity of the first virtual sub-edge line are similar, and the line-segment feature quantity of the second sub-edge line and the line-segment feature quantity of the second virtual sub-edge line are similar, the control proceeds to operation S354. If determined that the line-segment feature quantity of the first sub-edge line and the line-segment feature quantity of the first virtual sub-edge line are not similar, or the line-segment feature quantity of the second sub-edge line and the line-segment feature quantity of the second virtual sub-edge line are not similar, the control proceeds to operation S353.

In operation S353, a determination is made that the two selected sub-edge lines (the first sub-edge line and the second sub-edge line) are separate edge lines and not to be integrated.

In operation S354, the edge-line integration determination unit 124 determines to integrate the two selected edge lines (the first sub-edge line and the second sub-edge line). The edge-line integration determination unit 124 connects the two selected edge lines to generate an integrated edge line and records the information on the integrated edge line in the edge line information 143. Also, the line-segment feature quantity calculation unit 123 calculates the line-segment feature quantity of the integrated edge line.

In operation S355, if the processing for all the two adjacent sub-edge lines of all the sub-edge line groups including a plurality of sub-edge lines has been completed (that is to say, if the two adjacent sub-edge lines of all the sub-edge line groups including a plurality of sub-edge lines have been selected), the third-edge-line detection and integration processing is completed. Else if the processing for all the two adjacent sub-edge lines of all the sub-edge line groups including a plurality of sub-edge lines has not been completed, the control returns to operation S345.

By the third-edge-line detection and integration processing, it is possible to reduce the impact of the lengths of an edge line and a virtual edge line, and a change in the background on the line-segment feature quantity, and thus the detection precision of an integrated edge line is improved.

Figure 31:
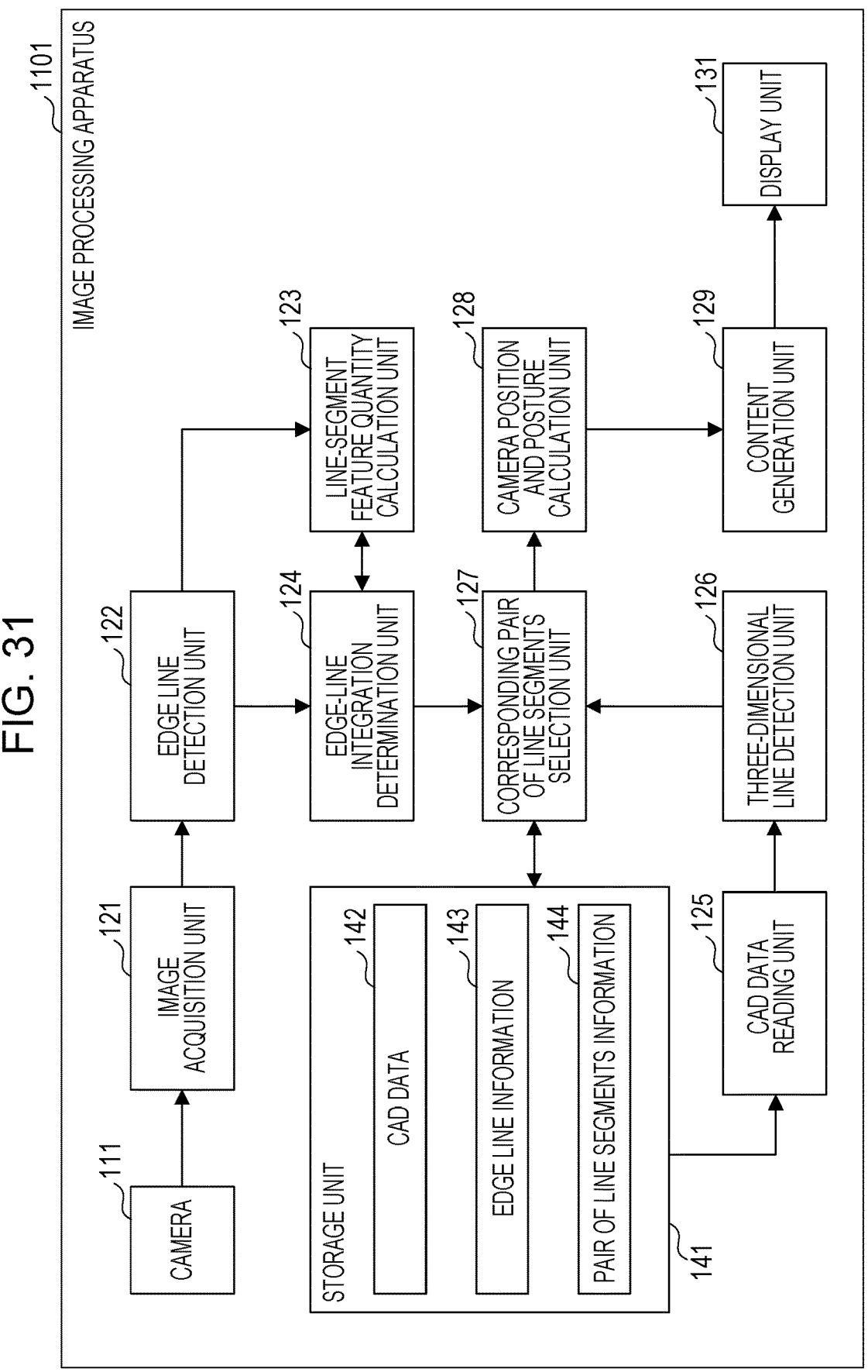
FIG. 31 is the configuration diagram of an image processing apparatus according to another embodiment.

FIG. 31 is the configuration diagram of an image processing apparatus according to another embodiment.

An image processing device 1101 includes a camera 111, an image acquisition unit 121, an edge-line detection unit 122, a line-segment feature quantity calculation unit 123, an edge-line integration determination unit 124, a CAD data reading unit 125, a three-dimensional line detection unit 126, a corresponding pair of line segments selection unit 127, a camera position and posture calculation unit 128, a content generation unit 129, a display unit 131, and a storage unit 141. The image processing device 1101 is, for example, a personal computer, a mobile phone, a mobile terminal, or the like.

The storage unit 141 stores CAD data 142, edge line information 143, and pair of line segments information 144.

CAD data 142 is model information representing a three-dimensional CAD model of an object included in the captured image and includes vertex information of a plurality of vertices included in the three-dimensional CAD model and the line segment information of a plurality of line segments.

The edge line information 143 is information on the edge line (including the integrated edge line) detected from the captured image.

The pair of line segments information 144 is the information that indicates association of the edge line (including the integrated edge line) detected from the captured image and the contour line of the three-dimensional model of the object represented by the CAD data 203.

Figure 32:
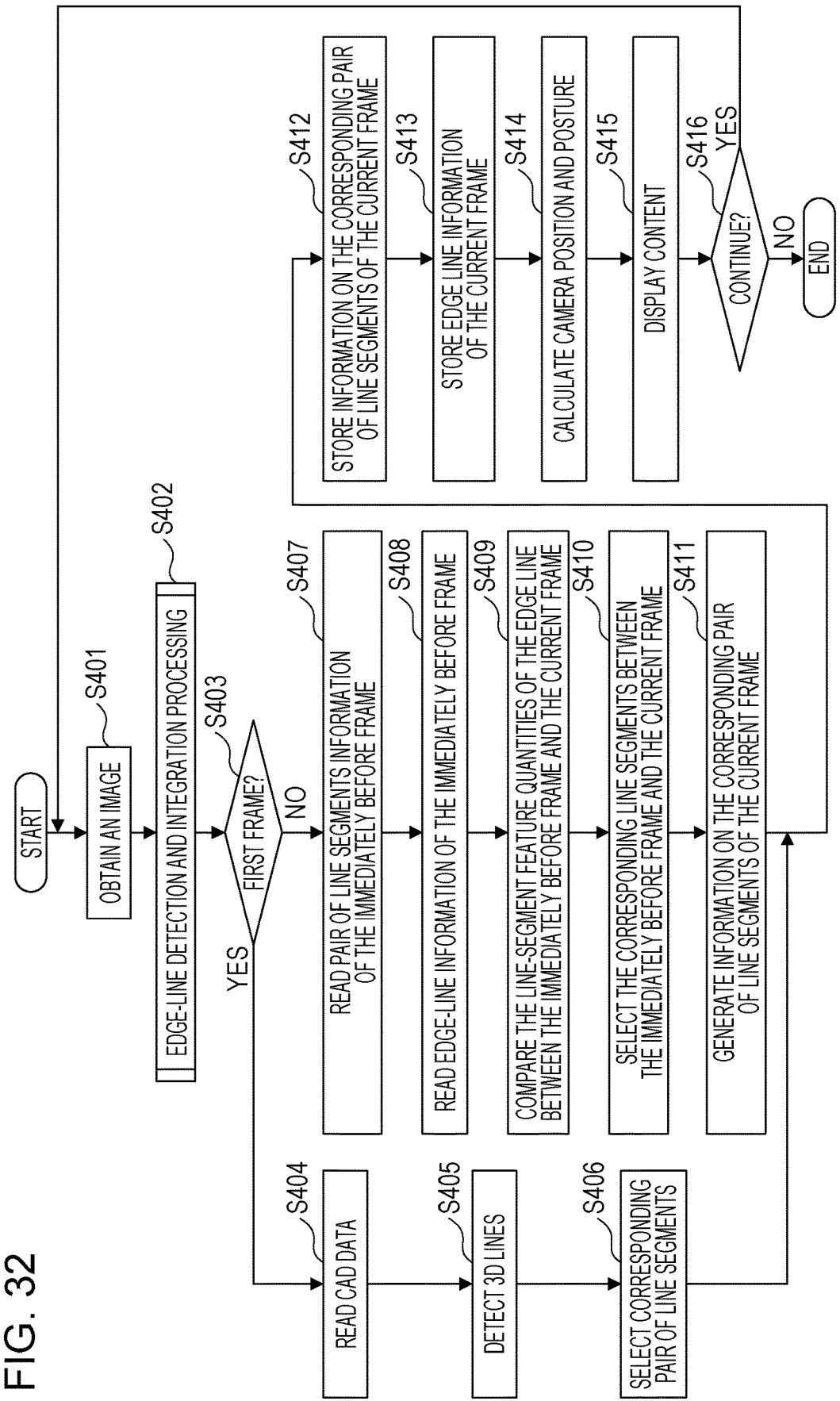
FIG. 32 is a flowchart of an image processing method according to the other embodiment.

FIG. 32 is a flowchart of an image processing method according to the other embodiment.

In operation S401, the image acquisition unit 121 obtains the i-th frame captured image taken by the camera 111 as the current frame from the camera 111. In this regard, the initial value of i is 1, and i is incremented by one each time the operation S401 is performed.

In operation S402, the edge detection unit 122, the line-segment feature quantity calculation unit 123 and the edge-line integration determination unit 124 perform the edge-line detection and integration processing. In operation S402, any one of the above-described first to third edge line detection and integration processing or any combination thereof is performed.

In operation S403, if the captured image obtained in operation S401 is the first-frame (first) captured image, the control proceeds to operation S404, whereas the captured image obtained in operation S401 is not the first-frame captured image, the control proceeds to operation S407.

In operation S404, the CAD data reading unit 125 reads CAD data 203 from the storage unit 141.

In operation S405, the three-dimensional line detection unit 126 detects 3D lines from the CAD data 203. The 3D lines are the contour lines (ridge lines) of the three-dimensional model of the object represented by the CAD data 203. For example, the three-dimensional line detection unit 126 extracts only the line segment indicating the outer shape feature of the three-dimensional CAD model from a plurality of line segments included in the CAD data 203 and uses the extracted line segments as a contour line.

In operation S406, the image processing device 101 displays the contour line indicated by the CAD data 142 and an edge line having been subjected to the integration processing on the display unit 131. The edge line having been subjected to the integration processing includes an integrated edge line produced by integrating edge lines that satisfy a predetermined condition and an edge line that does not satisfy the predetermined condition and thus have not been integrated. A user selects the displayed contour line and edge line using a mouse, or the like. The corresponding pair of line segments selection unit 127 associates the selected contour line and the edge line.

The corresponding pair of line segments selection unit 127 records the associated contour line and edge line in the pair of lines information 144-1.

Figure 33:
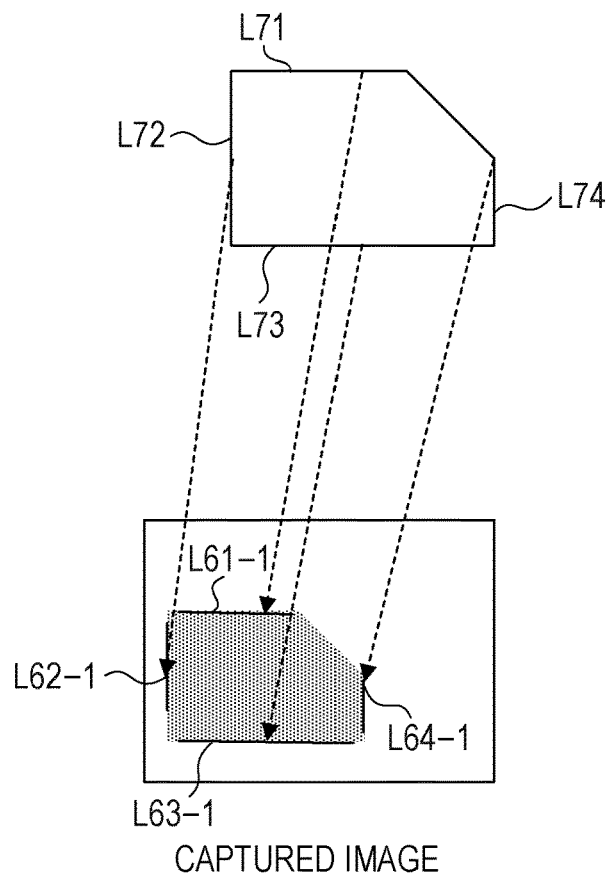
FIG. 33 is a diagram illustrating an example of the image processing method according to the other embodiment.

In FIG. 33, edge lines L61-1, L62-1, L63-1, and L64-1 are detected in a captured image. The contour lines L71 to L74 indicated by the CAD data 142 and the edge lines L61-1, L62-1, L63-1, and L64-1 are associated respectively.

In operation S407, the corresponding pair of line segments selection unit 127 reads the pair of lines information 144-($i$−1) of the frame immediately before the current frame.

In operation S408, the corresponding pair of line segments selection unit 127 reads the edge line information 143-($i$−1) of the frame immediately before the current frame.

In operation S409, the corresponding pair of line segments selection unit 127 compares the line-segment feature quantities included in the edge line information 143-$i$ of the current frame and the edge line information 143-($i$−1) of the immediately before frame respectively. For example, the corresponding pair of line segments selection unit 127 calculates the similarity between the line-segment feature quantity of each edge line included in the edge line information 143-$i$ and the line-segment feature quantity of each edge line of the edge line information 143-($i$−1). For the calculation of the similarity, the endpoint coordinates indicating the position of the edge line may be used.

In operation S410, the corresponding pair of line segments selection unit 127 detects edge lines of the current frame corresponding to the edge lines of the immediately before frame based on the calculated similarity.

In operation S411, the corresponding pair of line segments selection unit 127 associates the edge lines of the current frame with the contour line indicated by the CAD data 142 based on the associated edge lines of the current frame and the edge lines of the immediately before frame. The corresponding pair of line segments selection unit 127 generates information including the associated edge lines of the current frame and the contour line indicated by the CAD data 142.

A description will be given of an example of the above-described operations S409 to S411 using FIG. 34.

Figure 34:
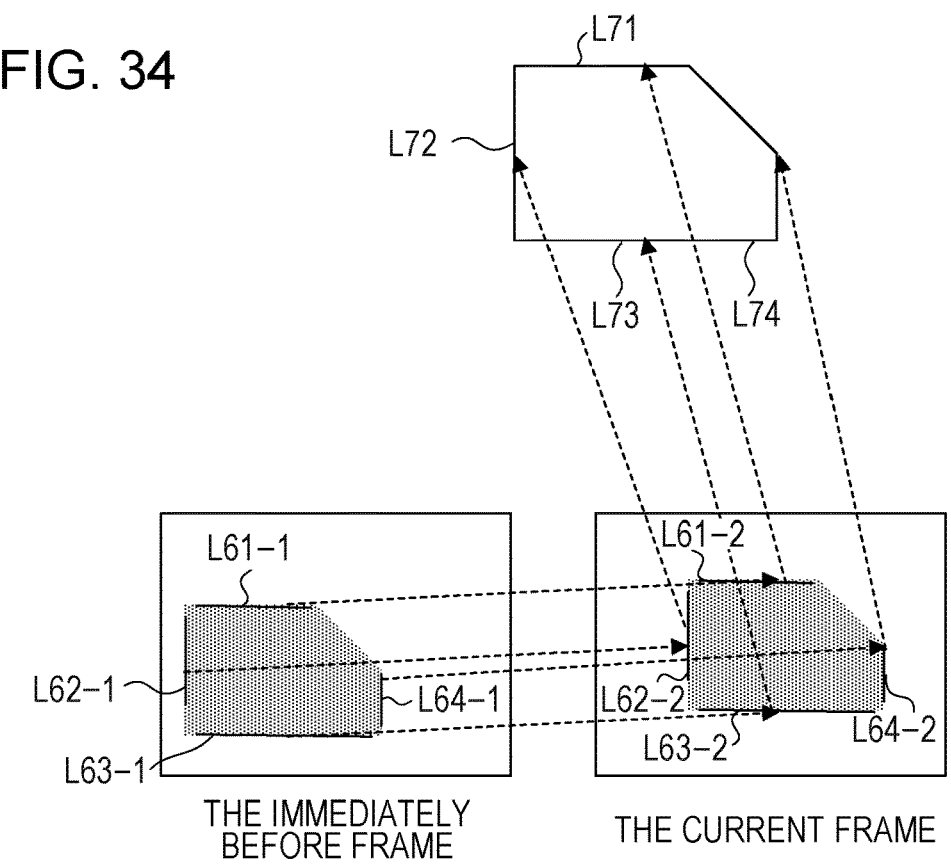
FIG. 34 is a diagram illustrating an example of the image processing method according to the other embodiment.

In FIG. 34, it is assumed that the current frame is the second frame of the captured image. In the current frame, the edge lines L61-2, L62-2, L63-2, and L64-2 are detected. In the immediately before frame, the edge lines L61-1, L62-1, L63-1, and L64-1 are detected. The corresponding pair of line segments selection unit 127 calculates the similarity between the line-segment feature quantities of the edge lines L61-2, L62-2, L63-2, and L64-2 of the current frame and the line-segment feature quantities of the edge lines L61-1, L62-1, L63-1, and L64-1 of the immediately before frame and detects edge lines of the current frame corresponding to the edge lines L61-1, L62-1, L63-1, and L64-1 of the immediately before frame.

As illustrated in FIG. 34, the edge line L61-2 of the current frame corresponds to the edge line L61-1, the edge line L62-2 of the current frame corresponds to the edge line L62-1, the edge line L63-2 of the current frame corresponds to the edge line L63-1, and the edge line L64-2 of the current frame corresponds to the edge line L64-1.

As described as to FIG. 33, the contour lines L71 to L74 indicated by the CAD data 142 and the edge lines L61-1, L62-1, L63-1, and L64-1 are associated respectively.

The contour line L71 is associated with the edge line L61-1, and the edge line L61-1 is associated with the edge line L61-2, and thus as illustrated in FIG. 34, the edge line L61-2 of the current frame is associated with the contour line L71. In the same manner, the edge lines L62-2, L63-2, and L64-2 of the current frame are associated with the contour lines L72 to L74 respectively. The information indicating the association of the edge lines of the current frame with the contour lines is generated.

Referring back to FIG. 32, a description will be continued.

In operation S412, the corresponding pair of line segments selection unit 127 records information indicating the associated edge lines of the current frame and the contour line indicated by the CAD data 142 in the pair of line segments information 144-$i$.

In operation S413, the corresponding pair of line segments selection unit 127 records the information on the edge lines of the current frame in the edge line information 143.

In operation S414, the camera position and posture calculation unit 128 calculates the position and posture of the camera 111 using a combination of the associated edge lines and the contour lines.

In operation S415, content is generated based on the calculation result by the camera position and posture calculation unit 128, and the generated content is displayed on the display unit 131. For example, the content generation unit 129 generates an image in which the contour lines indicated by the CAD data 142 are superimposed on the captured image based on the calculation result by the camera position and posture calculation unit 128, and displays the generated image on the display unit 131.

In operation S416, if an end instruction is input to the image processing device 1101, the processing is terminated, whereas if the end instruction is not input, the control returns to operation S401.

By the image processing device according to the other embodiment, it is possible to improve the detection precision of the line segment that indicates an edge of an object in the image.

By an image processing device according to the other embodiment, when tracking is performed as AR technology, the reliability of the association of the contour lines indicated by the CAD data with edge lines is improved.

Figure 35:
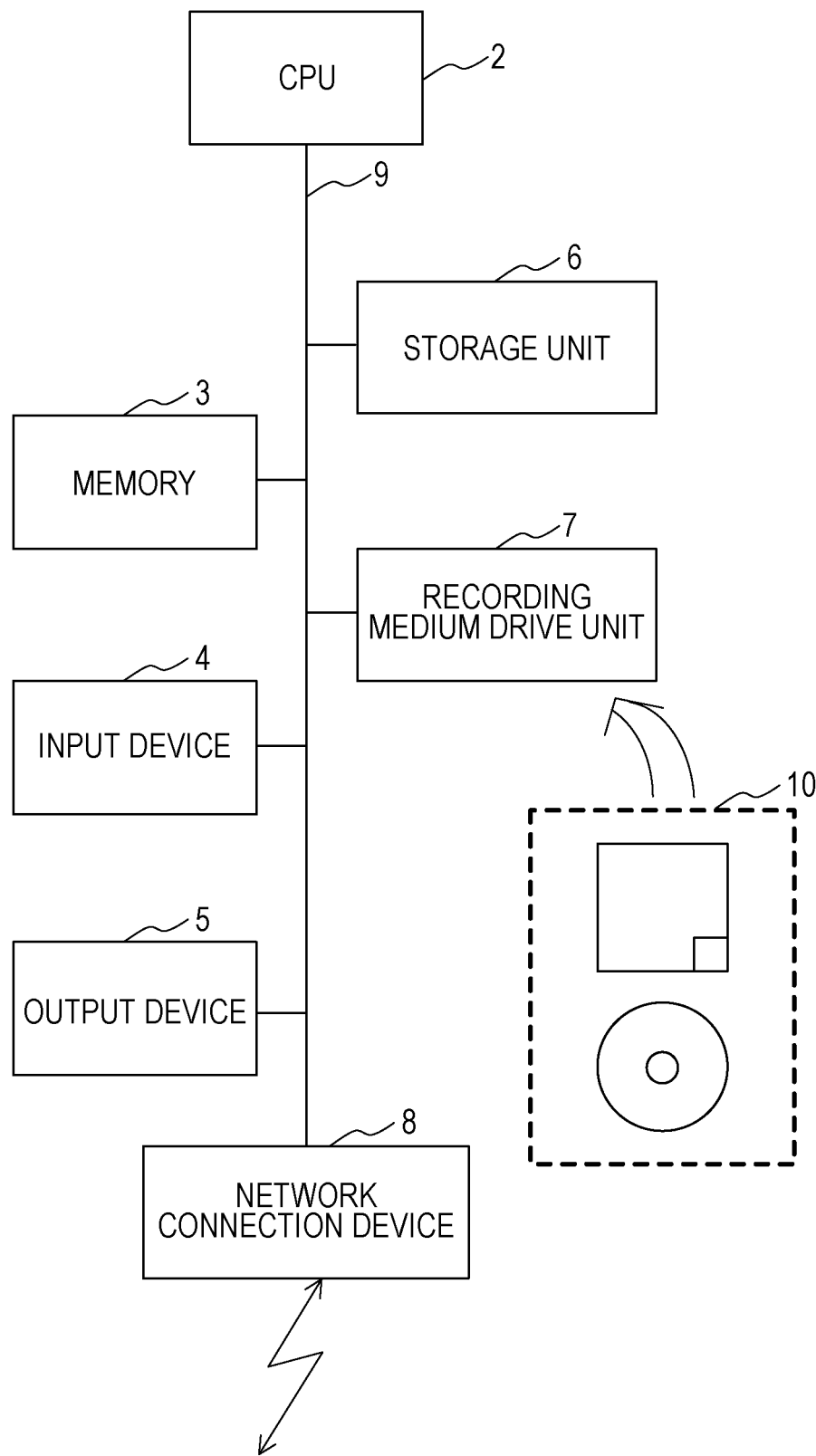
FIG. 35 is a configuration diagram of an information processing apparatus (computer).

FIG. 35 is a configuration diagram of an information processing apparatus (computer).

It is possible to realize the image processing devices 101 and 1101 according to the embodiments by, for example, an information processing apparatus (computer) 1 as illustrated in FIG. 35.

The information processing apparatus 1 includes a central processing unit (CPU) 2, a memory 3, an input device 4, an output device 5, a storage unit 6, a recording medium drive unit 7, and a network connection device 8, and these devices are mutually connected by a bus 9.

The CPU 2 is a central processing unit that controls the entire information processing apparatus 1. The CPU 2 operates the image acquisition unit 121, the edge-line detection unit 122, the line-segment feature quantity calculation unit 123, the edge-line integration determination unit 124, the CAD data reading unit 125, the three-dimensional line detection unit 126, the corresponding pair of line segments selection unit 127, the camera position and posture calculation unit 128, and the content generation unit 129.

The memory 3 is a memory, such as a read only memory (ROM), a random access memory (RAM), or the like that temporarily stores a program or data stored in the storage unit 6 (or portable recording medium 10) at the time of program execution. The CPU 2 executes the program using the memory 3 so as to perform the above-described various kinds of processing.

In this case, the program code itself read from the portable recording medium 10, or the like realizes the functions of the embodiments.

The input device 4 is used for inputting an instruction or information from a user or an operator or obtaining data used in the information processing apparatus 1, or the like. The input device 4 is, for example, a keyboard, a mouse, a touch panel, a camera, a sensor, or the like. The input device 4 corresponds to the camera 111.

The output device 5 is a device that outputs an inquiry to a user or an operator or a processing result under the control of the CPU 2. The output device 5 is, for example, a display, a printer, or the like. The output device 5 corresponds to the display unit 131.

The storage unit 6 is, for example, a magnetic disk device, an optical disc device, a tape device, or the like. The information processing apparatus 1 stores the above-described program and data in the storage unit 6 and reads the program and data into the memory 3 as demanded. The memory 3 and the storage unit 6 corresponds to the storage unit 141.

The recording medium drive unit 7 drives the portable recording medium 10 and accesses the recording contents. As a portable recording medium, any computer-readable recording medium, such as a memory card, a flexible disk, a compact disk read only memory (CD-ROM), an optical disc, magneto-optical disk, or the like is used. A user stores the above-described program and data in the portable recording medium 10, reads them into the memory 3, and uses them as demanded.

The network connection device 8 is a communication interface that is connected to any communication network, such as a local area network (LAN), a wide area network (WAN), or the like and performs data conversion involved in the communication. The network connection device 8 transmits data to a device connected via a communication network or receive data from a device connected via a communication network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing method comprising:
    detecting a plurality of line segments that indicate edges of an object, based on changes of pixel values of a plurality of pixels included in an input image, wherein each of the plurality of line segments is included in an input image;
    calculating a first feature quantity that includes a plurality of feature quantities for indicating features of individual pixel values of a plurality of pixels located in a first direction perpendicular to a first line segment out of the plurality of line segments and a plurality of feature quantities for indicating features of individual pixel values of a plurality of pixels located in a second direction opposite to the first direction with respect to the first line segment;
    calculating, based on pixel values of pixels located for each predetermined distance in a third direction perpendicular to a second line segment out of the plurality of line segments and pixel values of pixels located for each of the predetermined distance in a fourth direction opposite to the third direction with respect to the second line segment, a second feature quantity that includes a plurality of feature quantities for indicating individual features of the pixels located for each of the predetermined distance from the second line segment; and
    determining to integrate the first line segment and the second line segment, based on the first feature quantity and the second feature quantity, by a processor.

2. The image processing method according to claim 1, wherein the processor calculates a similarity between the first feature quantity and the second feature quantity, and determines to integrate the first line segment and the second line segment, based on a comparison result between the similarity and a threshold value.

3. The image processing method according to claim 1, further comprising:
    generating a third line segment with which connects an endpoint of the second line segment side out of endpoints of the first line segment and an endpoint of the first line segment side out of endpoints of the second line segment; and
    calculating a third feature quantity that includes a plurality of feature quantities for indicating features of individual pixel values of a plurality of pixels located in a fifth direction perpendicular to the third line segment and a plurality of feature quantities for indicating features of individual pixel values of a plurality of pixels located in a sixth direction opposite to the fourth direction with respect to the third line segment, by the processor,
    wherein the processor determines to integrate the first line segment and the second line segment, based on a similarity between the first feature quantity and the third feature quantity and a similarity between the second feature quantity and the third feature quantity.

4. The image processing method according to claim 1, further comprising:
    dividing the first line segment to generate a first plurality of sub-line segments;
    dividing the second line segment to generate a second plurality of sub-line segments;
    generating a third line segment with which connects a first endpoint of the second line segment side out of endpoints of the first line segment and a second endpoint of the first line segment side out of endpoints of the second line segment;
    dividing the third line segment to generate a third plurality of sub-line segments;
    calculating a first sub-line-segment feature quantity that includes a plurality of feature quantities for indicating features of individual pixel values of a plurality of pixels located in a fifth direction perpendicular to a first sub-line segment that includes the first endpoint out of the first plurality of sub-line segments, and a plurality of feature quantities for indicating features of individual pixel values of a plurality of pixels located in a sixth direction opposite to the fifth direction with respect to the first sub-line segment;

calculating a second sub-line-segment feature quantity that includes a plurality of feature quantities for indicating features of individual pixel values of a plurality of pixels located in a seventh direction perpendicular to a second sub-line segment that includes the second endpoint out of the second plurality of sub-line segments, and a plurality of feature quantities for indicating features of individual pixel values of a plurality of pixels located in an eighth direction opposite to the seventh direction with respect to the second sub-line segment;

calculating a third sub-line-segment feature quantity that includes a plurality of feature quantities for indicating features of individual pixel values of a plurality of pixels located in a ninth direction perpendicular to a third sub-line segment adjacent to the first sub-line segment out of the third plurality of sub-line segments, and a plurality of feature quantities for indicating features of individual pixel values of a plurality of pixels located in a tenth direction opposite to the ninth direction with respect to the third sub-line segment; and calculating a fourth sub-line-segment feature quantity that includes a plurality of feature quantities for indicating features of individual pixel values of a plurality of pixels located in an eleventh direction perpendicular to a fourth sub-line segment adjacent to the second sub-line segment out of the third plurality of sub-line segments, and a plurality of feature quantities for indicating features of individual pixel values of a plurality of pixels located in a twelfth direction opposite to the eleventh direction with respect to the third sub-line segment, by the processor, wherein the processor determines to integrate the first line segment and the second line segment, based on the first sub-line-segment feature quantity, the second sub-line-segment feature quantity, the third sub-line-segment feature quantity, and the fourth sub-line-segment feature quantity.

5. An image processing apparatus comprising:
a memory; and
a processor coupled to the memory and the processor configured to:
detect a plurality of line segments that indicate edges of an object, based on changes of pixel values of a plurality of pixels included in an input image, wherein each of the plurality of line segments is included in an input image;
calculate a first feature quantity that includes a plurality of feature quantities for indicating features of individual pixel values of a plurality of pixels located in a first direction perpendicular to a first line segment out of the plurality of line segments and a plurality of feature quantities for indicating features of individual pixel values of a plurality of pixels located in a second direction opposite to the first direction with respect to the first line segment;
calculate, based on pixel values of pixels located for each predetermined distance in a third direction perpendicular to a second line segment out of the plurality of line segments and pixel values of pixels located for each of the predetermined distance in a fourth direction opposite to the third direction with respect to the second line segment, a second feature quantity that includes a plurality of feature quantities for indicating individual features of the pixels located for each of the predetermined distance from the second line segment; and determine to integrate the first line segment and the second line segment, based on the first feature quantity and the second feature quantity.

6. The image processing apparatus according to claim 5, wherein the processor is configured to calculate a similarity between the first feature quantity and the second feature quantity, and determines to integrate the first line segment and the second line segment, based on a comparison result between the similarity and a threshold value.

7. The image processing apparatus according to claim 5, wherein the processor is further configured to:
generate a third line segment with which connects an endpoint of the second line segment side out of endpoints of the first line segment and an endpoint of the first line segment side out of endpoints of the second line segment; and
calculate a third feature quantity that includes a plurality of feature quantities for indicating features of individual pixel values of a plurality of pixels located in a fifth direction perpendicular to the third line segment and a plurality of feature quantities for indicating features of individual pixel values of a plurality of pixels located in a sixth direction opposite to the fourth direction with respect to the third line segment,
wherein the processor is configured to determine to integrate the first line segment and the second line segment, based on a similarity between the first feature quantity and the third feature quantity and a similarity between the second feature quantity and the third feature quantity.

8. The image processing apparatus according to claim 5, wherein the processor is further configured to:
divide the first line segment to generate a first plurality of sub-line segments;
divide the second line segment to generate a second plurality of sub-line segments;
generate a third line segment with which connects a first endpoint of the second line segment side out of endpoints of the first line segment and a second endpoint of the first line segment side out of endpoints of the second line segment;
divide the third line segment to generate a third plurality of sub-line segments;
calculate a first sub-line-segment feature quantity that includes a plurality of feature quantities for indicating features of individual pixel values of a plurality of pixels located in a fifth direction perpendicular to a first sub-line segment that includes the first endpoint out of the first plurality of sub-line segments, and a plurality of feature quantities for indicating features of individual pixel values of a plurality of pixels located in a sixth direction opposite to the fifth direction with respect to the first sub-line segment;
calculate a second sub-line-segment feature quantity that includes a plurality of feature quantities for indicating features of individual pixel values of a plurality of pixels located in a seventh direction perpendicular to a second sub-line segment that includes the second endpoint out of the second plurality of sub-line segments, and a plurality of feature quantities for indicating features of individual pixel values of a plurality of pixels located in an eighth direction opposite to the seventh direction with respect to the second sub-line segment;
calculate a third sub-line-segment feature quantity that includes a plurality of feature quantities for indicating features of individual pixel values of a plurality of pixels located in a ninth direction perpendicular to a third sub-line segment adjacent to the first sub-line segment out of the third plurality of sub-line segments, and a plurality of feature quantities for indicating features of individual pixel values of a plurality of pixels located in a tenth direction opposite to the ninth direction with respect to the third sub-line segment; and calculate a fourth sub-line-segment feature quantity that includes a plurality of feature quantities for indicating features of individual pixel values of a plurality of pixels located in an eleventh direction perpendicular to a fourth sub-line segment adjacent to the second sub-line segment out of the third plurality of sub-line segments, and a plurality of feature quantities for indicating features of individual pixel values of a plurality of pixels located in a twelfth direction opposite to the eleventh direction with respect to the third sub-line segment, wherein the processor is configured to determine to integrate the first line segment and the second line segment, based on the first sub-line-segment feature quantity, the second sub-line-segment feature quantity, the third sub-line-segment feature quantity, and the fourth sub-line-segment feature quantity.

9. A computer-readable non-transitory recording medium storing a program that causes a computer to execute a procedure, the procedure comprising:

detecting a plurality of line segments that indicate edges of an object, based on changes of pixel values of a plurality of pixels included in an input image, wherein each of the plurality of line segments is included in an input image;

calculating a first feature quantity that includes a plurality of feature quantities for indicating features of individual pixel values of a plurality of pixels located in a first direction perpendicular to a first line segment out of the plurality of line segments and a plurality of feature quantities for indicating features of individual pixel values of a plurality of pixels located in a second direction opposite to the first direction with respect to the first line segment;

calculating, based on pixel values of pixels located for each predetermined distance in a third direction perpendicular to a second line segment out of the plurality of line segments and pixel values of pixels located for each of the predetermined distance in a fourth direction opposite to the third direction with respect to the second line segment, a second feature quantity that includes a plurality of feature quantities for indicating individual features of the pixels located for each of the predetermined distance from the second line segment; and determining to integrate the first line segment and the second line segment, based on the first feature quantity and the second feature quantity, by a processor.

10. The computer-readable non-transitory recording medium according to claim 9, wherein the procedure calculates a similarity between the first feature quantity and the second feature quantity, and determines to integrate the first line segment and the second line segment, based on a comparison result between the similarity and a threshold value.

11. The computer-readable non-transitory recording medium according to claim 9, the procedure further comprising:

generating a third line segment with which connects an endpoint of the second line segment side out of endpoints of the first line segment and an endpoint of the first line segment side out of endpoints of the second line segment; and calculating a third feature quantity that includes a plurality of feature quantities for indicating features of individual pixel values of a plurality of pixels located in a fifth direction perpendicular to the third line segment and a plurality of feature quantities for indicating features of individual pixel values of a plurality of pixels located in a sixth direction opposite to the fourth direction with respect to the third line segment, wherein the procedure determines to integrate the first line segment and the second line segment, based on a similarity between the first feature quantity and the third feature quantity and a similarity between the second feature quantity and the third feature quantity.

12. The computer-readable non-transitory recording medium according to claim 9, the procedure further comprising:

dividing the first line segment to generate a first plurality of sub-line segments;

dividing the second line segment to generate a second plurality of sub-line segments;

generating a third line segment with which connects a first endpoint of the second line segment side out of endpoints of the first line segment and a second endpoint of the first line segment side out of endpoints of the second line segment;

dividing the third line segment to generate a third plurality of sub-line segments;

calculating a first sub-line-segment feature quantity that includes a plurality of feature quantities for indicating features of individual pixel values of a plurality of pixels located in a fifth direction perpendicular to a first sub-line segment that includes the first endpoint out of the first plurality of sub-line segments, and a plurality of feature quantities for indicating features of individual pixel values of a plurality of pixels located in a sixth direction opposite to the fifth direction with respect to the first sub-line segment;

calculating a second sub-line-segment feature quantity that includes a plurality of feature quantities for indicating features of individual pixel values of a plurality of pixels located in a seventh direction perpendicular to a second sub-line segment that includes the second endpoint out of the second plurality of sub-line segments, and a plurality of feature quantities for indicating features of individual pixel values of a plurality of pixels located in an eighth direction opposite to the seventh direction with respect to the second sub-line segment;

calculating a third sub-line-segment feature quantity that includes a plurality of feature quantities for indicating features of individual pixel values of a plurality of pixels located in a ninth direction perpendicular to a third sub-line segment adjacent to the first sub-line segment out of the third plurality of sub-line segments, and a plurality of feature quantities for indicating features of individual pixel values of a plurality of pixels located in a tenth direction opposite to the ninth direction with respect to the third sub-line segment; and calculating a fourth sub-line-segment feature quantity that includes a plurality of feature quantities for indicating features of individual pixel values of a plurality of pixels located in an eleventh direction perpendicular to a fourth sub-line segment adjacent to the second sub-line segment out of the third plurality of sub-line segments, and a plurality of feature quantities for indicating features of individual pixel values of a plurality of pixels located in a twelfth direction opposite to the eleventh direction with respect to the third sub-line segment, wherein the procedure determines to integrate the first line segment and the second line segment, based on the first sub-line-segment feature quantity, the second sub-line-segment feature quantity, the third sub-line-segment feature quantity, and the fourth sub-line-segment feature quantity.

\* \* \* \* \*